US011142858B2

(12) United States Patent
Vitali

(10) Patent No.: US 11,142,858 B2
(45) Date of Patent: Oct. 12, 2021

(54) LAUNDRY APPLIANCE COMPRISING A HUMIDITY SENSOR

(71) Applicant: Electrolux Appliances Aktiebolag, Stockholm (SE)

(72) Inventor: Fabio Vitali, Porcia PN (IT)

(73) Assignee: Electrolux Appliances Aktiebolag

( * ) Notice: Subject to any disclaimer, the term of this patent is extended or adjusted under 35 U.S.C. 154(b) by 179 days.

(21) Appl. No.: 16/472,506

(22) PCT Filed: Dec. 28, 2016

(86) PCT No.: PCT/EP2016/082747
§ 371 (c)(1),
(2) Date: Jun. 21, 2019

(87) PCT Pub. No.: WO2018/121849
PCT Pub. Date: Jul. 5, 2018

(65) Prior Publication Data
US 2020/0181824 A1  Jun. 11, 2020

(51) Int. Cl.
*F26B 19/00* (2006.01)
*D06F 34/18* (2020.01)
(Continued)

(52) U.S. Cl.
CPC .............. *D06F 34/18* (2020.02); *D06F 34/04* (2020.02); *D06F 58/38* (2020.02); *G01N 27/223* (2013.01);
(Continued)

(58) Field of Classification Search
CPC .......... D06F 34/18; D06F 34/04; D06F 58/38; D06F 58/04; D06F 2105/12;
(Continued)

(56) References Cited

U.S. PATENT DOCUMENTS 4,215,486 A * 8/1980 Heyer .................... G05D 22/02
34/527
4,438,402 A * 3/1984 Cullen .................. G01B 7/044
324/452

(Continued)

FOREIGN PATENT DOCUMENTS

DE        19651883 C1    4/1998
DE    102009029621 A1    3/2011
(Continued)

OTHER PUBLICATIONS

International Search Report and Written Opinion for International Application No. PCT/EP2016/082747, dated Sep. 12, 2017, 11 Pages.
(Continued)

*Primary Examiner* — John P McCormack
(74) *Attorney, Agent, or Firm* — RatnerPrestia

(57) ABSTRACT

A laundry appliance having a laundry drying chamber and a sensor for measuring the humidity of laundry items contained in the laundry drying chamber. The sensor includes an operating support having a first surface and a second surface opposite to the first surface. The sensor also has at least one first pad provided on the first surface of the operating support and at least one second pad provided on the second surface of the operating support, both the first pad and the second pad being made of an electrically conductive material and being adapted to operate as a plate of a capacitor. Methods for detecting humidity of laundry items are also provided.

14 Claims, 8 Drawing Sheets

(51) Int. Cl.
  *D06F 34/04* (2020.01)
  *D06F 58/38* (2020.01)
  *G01N 27/22* (2006.01)
  *D06F 105/12* (2020.01)
  *D06F 103/10* (2020.01)

(52) U.S. Cl.
  CPC ...... *D06F 2103/10* (2020.02); *D06F 2105/12* (2020.02)

(58) Field of Classification Search
  CPC ............ D06F 2103/10; D06F 2103/34; D06F 2103/44; G01N 27/223
  USPC .................................................. 34/528, 524
  See application file for complete search history.

(56) References Cited

U.S. PATENT DOCUMENTS

| | | | | |
|---|---|---|---|---|
| 4,482,581 | A | | 11/1984 | Lorin et al. |
| 4,965,698 | A | | 10/1990 | Thoma et al. |
| 5,757,181 | A | * | 5/1998 | Wolf ............... F02D 11/106 324/207.12 |
| 6,784,673 | B2 | * | 8/2004 | Tomasi ................ D06F 58/04 324/664 |
| 2003/0235993 | A1 | | 12/2003 | Leung et al. |
| 2004/0051540 | A1 | | 3/2004 | Tomasi et al. |
| 2004/0211083 | A1 | * | 10/2004 | Park ..................... D06F 58/30 34/528 |
| 2014/0152519 | A1 | | 6/2014 | Buyuk-Kalender et al. |
| 2014/0325865 | A1 | | 11/2014 | Wisherd et al. |
| 2015/0101207 | A1 | | 4/2015 | Herman et al. |
| 2015/0124416 | A1 | * | 5/2015 | Lin ..................... H05K 1/183 361/761 |
| 2015/0153104 | A1 | * | 6/2015 | Bae ..................... D06F 58/04 34/108 |
| 2015/0185176 | A1 | * | 7/2015 | Koo ................... G01N 27/223 73/335.04 |
| 2016/0130743 | A1 | | 5/2016 | Wisherd et al. |

FOREIGN PATENT DOCUMENTS

| | | |
|---|---|---|
| EP | 0967319 A1 | 12/1999 |
| EP | 1413664 A1 | 4/2004 |
| EP | 2458075 A1 | 5/2012 |
| EP | 2601339 A2 | 6/2013 |
| EP | 3124676 A1 | 2/2017 |
| EP | 3162952 A1 | 5/2017 |
| WO | 2006040781 A2 | 4/2006 |
| WO | 2012016820 A2 | 2/2012 |

OTHER PUBLICATIONS

International Search Report and Written Opinion for International Application No. PCT/EP2016/075190, dated Jan. 2, 2017, 8 pages.
International Search Report and Written Opinion for International Application No. PCT/EP2018/055681, dated Nov. 22, 2018, 12 pages.

* cited by examiner

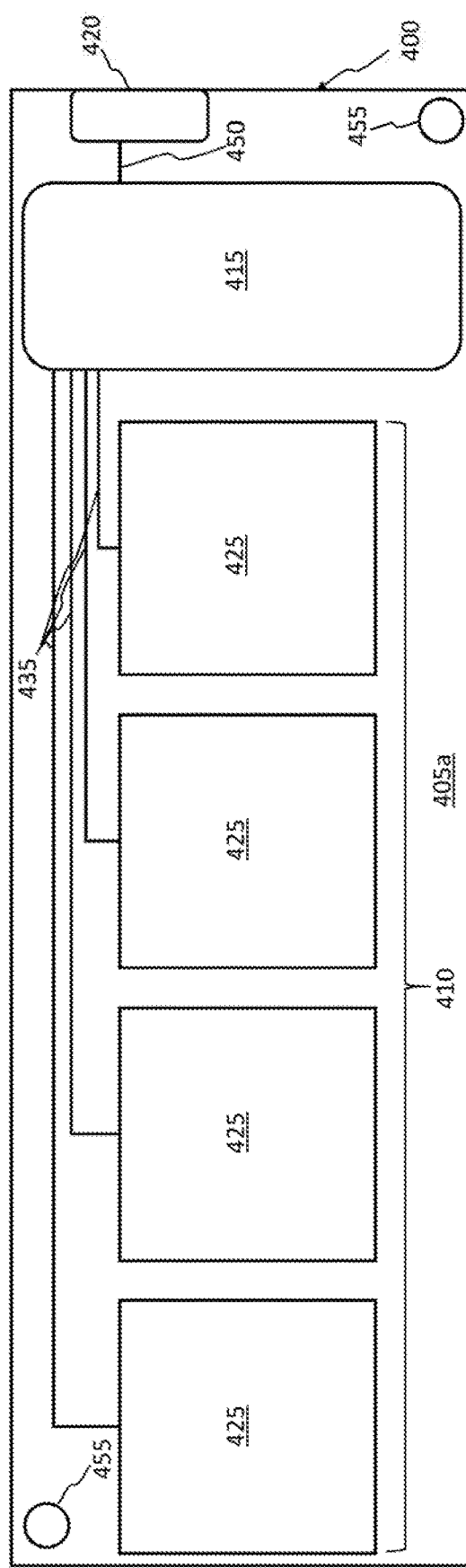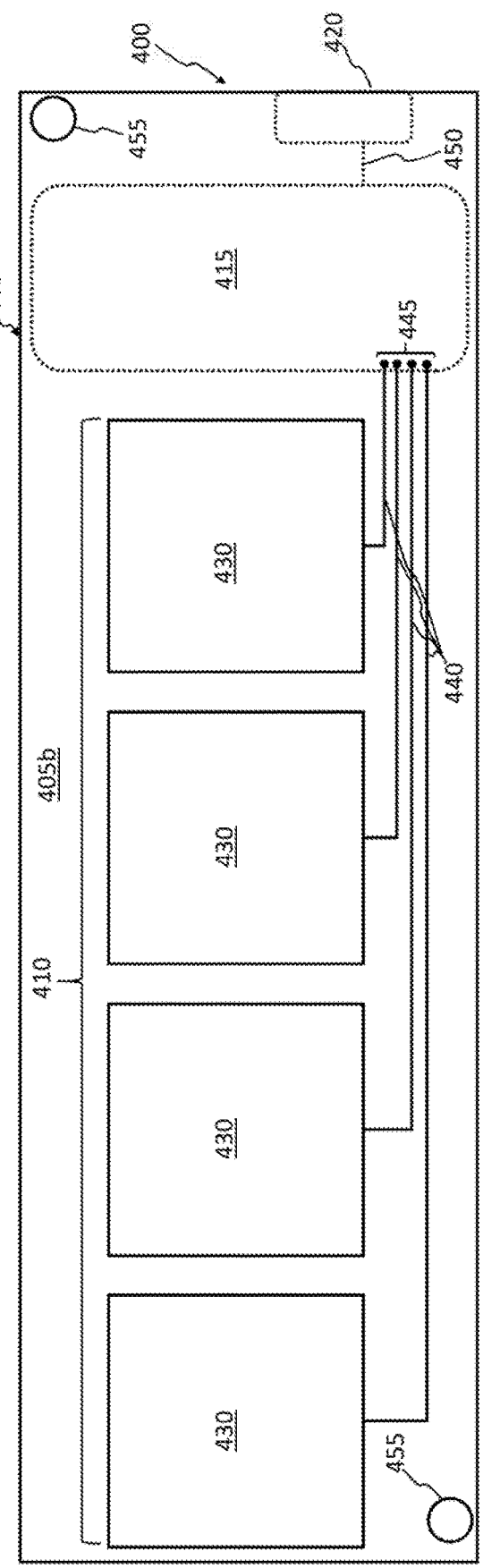

LAUNDRY APPLIANCE COMPRISING A HUMIDITY SENSOR

This application is a U.S. National Phase application of PCT International Application No. PCT/EP2016/082747, filed Dec. 28, 2016, which is incorporated by reference herein.

BACKGROUND OF THE PRESENT INVENTION

Field of the Present Invention

The present invention generally relates to the field of laundry (linen, clothes, garments and the like) treatment appliances (hereinafter, shortly, laundry appliances), and particularly to appliances for drying laundry or laundry drying appliances (laundry dryers or laundry washing machines also implementing a laundry drying function, also referred to as combined laundry washers and dryers). Specifically, the present invention relates to a laundry appliance with capacitive laundry mass (i.e., one or more laundry items) drying degree sensing capabilities, which are exploited for controlling the progress of the laundry mass drying process.

Overview of the Related Art

Laundry drying appliances exploit a flow of warm air for drying a laundry mass.

The laundry mass to be dried is housed in a laundry drying chamber, which quite often comprises a rotary drum accommodated within a machine cabinet and rotatable for causing the laundry to tumble while drying air is forced to pass therethrough (such appliances are also called "tumble dryers"). The rotation of the drum causes agitation of the items in the laundry treatment chamber that are to be dried, while the items being dried are hit by the drying air flow.

Combined laundry washer and dryer appliances combine the features of a washing machine with those of a dryer. In combined laundry washer and dryer appliances, the rotary drum is contained in a washing tub.

In laundry drying appliances that are not equipped with a laundry mass humidity measuring system, the user has to set a laundry drying program by choosing the time duration thereof. To do so, the user can rely on recommendations, e.g. in the form of time charts, provided by the appliance manufacturers, but this may lead to excessive and useless power consumptions if the laundry drying programs set by the user have drying times longer than what is actually required for drying the specific load of laundry. For example, some users may intentionally or unintentionally disregard the recommendations of the appliance manufacturer and set laundry drying programs that last more than what suggested by the appliance manufacturer for specific types of laundry. Moreover, even following the recommendations of the appliance manufacturer, the set drying programs may not achieve optimal results in terms of drying performance and power consumption.

In some laundry drying appliances the drying process duration is predetermined according to the user selected drying program. Also in this case the results of the drying process strongly depend on the laundry amount (laundry mass) placed within the drying chamber and the laundry type.

Laundry appliances are known which are equipped with laundry mass humidity measuring systems.

For example, EP 1413664 discloses a system in which a pair of plates of a condenser, are arranged around the linen, where the plates act as the dielectric to measure the capacity of the condenser. The humidity of the linen is determined according to the measured capacity.

SUMMARY OF THE PRESENT INVENTION

The Applicant has observed humidity measuring arrangements known in the art and devised for measuring an impedance of the laundry mass lack of a precision and accuracy required for providing an efficient laundry drying process able to provide laundry items died in a satisfactory manner for the user.

For example, EP 1413664 mentioned above requires to provide one metal plate of the pair of condenser plates on the outer surface of an inner wall of door of a laundry machine. Particularly, the metal plate is described as having a semi-circular shape and being in the lower half of door wall. Such an arrangement substantial hinder the ability of a user to see the interior of the drum once the door is closed with respect to a common laundry machine lacking the metal plate.

Moreover, the metal plate is described to be mounted by means of a bi-adhesive tape that is a complex and time-consuming task negatively affecting a manufacturing yield. Additionally, the bi-adhesive tape does not ensure a reliable fixing of the metal plate since moisture, water and/or treating products could solve the adhesive of the bi-adhesive tape leading to a loosely attachment, or even detachment, of the metal plate.

Further, exploiting the drum, or providing a metal plate on the drum, as capacitor plate leads to a complex electrical wiring harness. Indeed, since the drum rotates during the laundry machine operation, direct wirings cannot be used but complex (either from a structural and a manufacturing point of view) and costly expedients (such as for example a slip ring arrangement) need to be implemented in order to transfer electrical signals from the drum to a control unit of the laundry machine.

The Applicant has therefore tackled the problem of enhancing an accuracy and precision of humidity measures performed during the drying process of laundry items.

The Applicant has found that is possible to provide humidity sensor comprising a structure featuring a plurality of capacitance-sensing pads, a protective packaging, one or more temperature sensors and/or a suitable positioning of electronic connector allows improving the performance and reliability of the humidity sensor.

Moreover, the Applicant has found that the precision and accuracy of the humidity measurements may be greatly improved by providing a humidity sensor capable of performing differential measurements of the humidity of a laundry mass.

According to an aspect thereof, the present invention provides a laundry appliance. The laundry appliance comprises a laundry drying chamber and a sensor for measuring the humidity of laundry items contained in the laundry drying chamber, said sensor comprising a sensing arrangement provided for generating one or more electric signals accounting for a degree of humidity of the laundry items contained in the laundry drying chamber. The sensor further comprises an operating support having a first surface and a second surface opposite to the first surface. In addition, the sensing arrangement of the sensor further comprises at least one first pad provided on the first surface of the operating support and a respective at least one second pad provided on the second surface of the operating support, both the first pad and the second pad being made of an electrically conductive material and being adapted to operate as a plate of a capacitor.

Preferred features of the present invention are set in the dependent claims.

In an embodiment of the invention, each of said at least one first pad and respective at least one second pad are arranged on the first surface and, respectively, on the second surface of the operating support so as to be substantially superimposed one to the other in a direction orthogonal to said first and second surfaced and separated by the operating support.

In an embodiment of the invention, the operating support comprises an electronic board comprising a respective metal layer provided at the first surface and at the second surface. Preferably, the at least one first pad and the at least one second pad being provided by etching said metal layer provided at the first surface and at the second surface, respectively.

In an embodiment of the invention, the at least one first pad and the at least one second pad have substantially the same size and shape in plan view.

In an embodiment of the invention, the sensor further comprises a control circuitry configured for processing electric signals generated by the sensing arrangement. Preferably, at least one first track is formed on the operating support for electrically connecting the at least one first pad with the control circuitry. Further preferably, at least one second track is formed on the operating support for electrically connecting the at least one second pad with the control circuitry.

In an embodiment of the invention, the control circuitry is provided on the first surface of the operating support. Preferably, the sensor further comprises at least one via, the at least one via passing through the operating support from the first surface to the second surface and being electrically connected to the least one second track on the second surface and to the control circuitry on the first surface.

In an embodiment of the invention, the control circuitry comprises one or more electronic components arranged for filtering, amplifying, digitalizing, and/or otherwise manipulating the electric signals generated by the sensing arrangement.

In an embodiment of the invention, the laundry appliance further comprises a cabinet accommodating the laundry treatment chamber. Preferably, the cabinet comprises a front panel, and a cover plate mountable to the front panel, the cover plate comprising a housing for housing the sensor.

In an embodiment of the invention, the cover plate comprises an outer surface and an inner surface opposite to the outer surface, the outer surface facing towards the laundry items contained in the laundry treatment chamber and the inner surface facing the front panel once the cover plate is mounted to the front panel of the cabinet. Preferably, the housing is provided on the inner surface of the cover plate.

In an embodiment of the invention, the housing comprises a sidewall protruding from the inner surface of the cover plate. Preferably, the sidewall encloses the sensor once the latter is received in the housing.

In an embodiment of the invention, the at least one second pad provided on the second surface of the sensor is in contact with the inner surface of the cover plate when the sensor is positioned within the housing.

In an embodiment of the invention, the housing further comprises at least one retaining element engaging with the sensor and maintaining the sensor in position with the second surface of the sensor in contact with the inner surface of the cover plate.

In an embodiment of the invention, the laundry appliance further comprises a protective packaging surrounding the sensor. Preferably, the protective packaging insulates the sensor from moisture and foreign matters.

In an embodiment of the invention, the sidewall of the housing has a height equal to, or greater than, a thickness the sensor encapsulated in the protective packaging.

In an embodiment of the invention, the protective package comprises a potting encapsulation encapsulating the sensor, the potting encapsulation insulating the sensor from moisture and foreign matters.

In an embodiment of the invention, the potting encapsulation may comprise at least one insulating material, preferably a flowable insulating material. Preferably, the at least one insulating material comprises silicones, epoxies, polyesters, and urethanes.

In an embodiment of the present invention, the potting encapsulation is provided by injecting the at least one insulating material over the humidity sensor positioned in the housing. Preferably, the whole housing is filled with the insulating materials. Even more preferably, the insulating materials are deposited in the housing until are substantially flush with a free end of the perimeter sidewall.

In an embodiment of the invention, the laundry appliance further comprises an electronic control unit configured for managing the operation of the laundry appliance. Preferably, the sensor further comprises a connector interface electrically coupled with the control circuitry. Even more preferably, the connector interface receives wirings for allowing performing at least one between receiving electric power supply, and exchanging electric signals with the control unit of the laundry appliance.

In an embodiment of the invention, the connector interface comprises a connector device manufactured according to the Surface Mounting Technology and is mounted to one between the first surface and the second surface of the operating support.

In an embodiment of the invention, the connector interface may be provided protruding laterally from the electronic board. Preferably, the connector interface may be flush with the top and back surfaces and, respectively, of the operating support. Even more preferably, the connector interface is integral with the electronic board.

In an embodiment of the invention, the connector interface may comprise one or more, e.g. 4, electrically conductive pins (not shown) protruding laterally from a side of the electronic board. Preferably, the pins may be provided as a cantilevered structures or resting on a dielectric substrate also protruding from the operating support. Advantageously, the pins are adapted for being received in a respective connector.

In an embodiment of the invention, the wirings are welded directly to the connector interface.

In an embodiment of the invention, the cover plate comprises a material and a thickness separating the outer surface from the inner surface which ensure that an amount of electrostatic charge acquired by the cover plate during the laundry appliance operation keeps a conductivity of the cover plate in an interval ranging from $10^{-14}$ S/cm to 10–11 S/cm.

In an embodiment of the invention, the sensor further comprises a temperature sensor arranged for acquiring a temperature information exploited for correcting temperature-induced errors affecting the humidity measurements In an embodiment of the invention, the temperature sensor is comprised in, or is electrically connected to, the control circuitry of the sensor.

In an embodiment of the invention, the temperature sensor comprise a Negative Temperature Coefficient—NTC—resistor.

Another aspect according to the present invention relates to a method of sensing humidity of a laundry mass comprised in a laundry appliance of above. The method comprises acquiring a first capacity information from the at least one first pad, acquiring a second capacity information from the at least one second pad, and combining the first capacity information and the second capacity information in a combined capacity information. Preferably, combining comprises differentially combining the first capacity information and the second capacity information in order to reduce detrimental effects that affects substantially equally the at least one first pad and the at least one second pad.

Another aspect according to the present invention relates to a further laundry appliance. The laundry appliance comprises a laundry drying chamber and a sensor for measuring the humidity of laundry items contained in the laundry drying chamber. Said sensor comprises at least one pad made of an electrically conductive material and being adapted to operate as a plate of a capacitor and a sensing arrangement provided for generating one or more electric signals accounting for a degree of humidity of the laundry items contained in the laundry drying chamber. The appliance further comprises a protective packaging surrounding the sensor. Preferably, the protective packaging insulating the sensor from moisture and foreign matters.

In an embodiment of the invention, the laundry appliance further comprises a cabinet accommodating the laundry treatment chamber, the cabinet comprising a front panel, and a cover plate mountable to the front panel, the cover plate comprising a housing for housing the sensor. Preferably, the housing is sized for housing the sensor encapsulated in the protective packaging.

In an embodiment of the invention, the housing comprises a sidewall protruding from the inner surface of the cover plate, the sidewall enclosing the sensor once the latter is received in the housing, and the sidewall of the housing has a height equal to, or greater than, a thickness the sensor encapsulated in the protective packaging.

In an embodiment of the invention, the protective package comprises a potting encapsulation encapsulating the sensor, the potting encapsulation insulating the sensor from moisture and foreign matters.

In an embodiment of the invention, the potting encapsulation may comprise at least one insulating material, preferably a flowable insulating material. Preferably, the at least one insulating material comprises silicones, epoxies, polyesters, and urethanes.

In an embodiment of the present invention, the potting encapsulation is provided by injecting the at least one insulating material over the humidity sensor positioned in the housing. Preferably, the whole housing is filled with the insulating materials. Even more preferably, the insulating materials are deposited in the housing until are substantially flush with a free end of the perimeter sidewall.

In an embodiment of the invention, the sensor further comprises an operating support having a first surface and a second surface opposite to the first surface. In addition, the at least one pad comprises at least one first pad provided on the first surface of the operating support and a respective at least one second pad provided on the second surface of the operating support.

In an embodiment of the invention, each of said at least one first pad and a respective at least one second pad are arranged on the first surface and, respectively, on the second surface of the operating support so as to be substantially superimposed one to the other in a direction orthogonal to said first and second surfaced and separated by the operating support.

In an embodiment of the invention, the operating support comprises an electronic board comprising a respective metal layer provided at the first surface and at the second surface, the at least one first pad and the at least one second pad being provided by etching said metal layer provided at the first surface and at the second surface, respectively.

In an embodiment of the invention, the at least one first pad and the at least one second pad have substantially the same size and shape in plan view.

In an embodiment of the invention, the sensor further comprises a control circuitry configured for processing electric signals generated by the sensing arrangement. Preferably, at least one first track is formed on the operating support for electrically connecting the at least one first pad with the control circuitry. Further preferably, at least one second track is formed on the operating support for electrically connecting the at least one second pad with the control circuitry.

In an embodiment of the invention, the control circuitry is provided on the first surface of the operating support. Preferably, the sensor further comprises at least one via, the at least one via passing through the operating support from the first surface to the second surface and being electrically connected to the least one second track on the second surface and to the control circuitry on the first surface.

In an embodiment of the invention, the control circuitry comprises one or more electronic components arranged for filtering, amplifying, digitalizing, and/or otherwise manipulating the electric signals generated by the sensing arrangement.

In an embodiment of the invention, the cover plate comprises an outer surface and an inner surface opposite to the outer surface, the outer surface facing towards the laundry items contained in the laundry treatment chamber and the inner surface facing the front panel once the cover plate is mounted to the front panel of the cabinet. Preferably, the housing is provided on the inner surface of the cover plate.

In an embodiment of the invention, the at least one second pad provided on the second surface of the sensor is in contact with the inner surface of the cover plate when the sensor is positioned within the housing.

In an embodiment of the invention, the housing further comprises at least one retaining element engaging with the sensor and maintaining the sensor in position with the second surface of the sensor in contact with the inner surface of the cover plate.

In an embodiment of the invention, the laundry appliance further comprises an electronic control unit configured for managing the operation of the laundry appliance. Preferably, the sensor further comprises a connector interface electrically coupled with the control circuitry. Even more preferably, the connector interface receives wirings for allowing performing at least one between receiving electric power supply, and exchanging electric signals with the control unit of the laundry appliance.

In an embodiment of the invention, the connector interface comprises a connector device manufactured according to the Surface Mounting Technology and is mounted to one between the first surface and the second surface of the operating support.

In an embodiment of the invention, the sensor comprises a control circuitry configured for processing, or at least pre-processing, electric signals generated by the sensing arrangement, both the control circuitry and the connector interface are provided on the same surface between the first surface and the second surface.

In an embodiment of the invention, the connector interface may be provided protruding laterally from the electronic board. Preferably, the connector interface may be flush with the top and back surfaces and, respectively, of the operating support. Even more preferably, the connector interface is integral with the electronic board.

In an embodiment of the invention, the connector interface may comprise one or more, e.g. 4, electrically conductive pins (not shown) protruding laterally from a side of the electronic board. Preferably, the pins may be provided as a cantilevered structures or resting on a dielectric substrate also protruding from the operating support. Advantageously, the pins are adapted for being received in a respective connector.

In an embodiment of the invention, the wirings are welded directly to the connector interface.

In an embodiment of the invention, wherein the cover plate comprises a material and a thickness separating the outer surface from the inner surface which ensure that an amount of electrostatic charge acquired by the cover plate during the laundry appliance operation keeps a conductivity of the cover plate in an interval ranging from $10^{-14}$ S/cm to $10^{-11}$ S/cm.

In an embodiment of the invention, the sensor further comprises a temperature sensor arranged for acquiring a temperature information exploited for correcting temperature-induced errors affecting the humidity measurements.

In an embodiment of the invention, the sensor further comprises a control circuitry configured for processing electric signals generated by the sensing arrangement. Preferably, the temperature sensor is comprised in, or is electrically connected to, the control circuitry of the sensor.

In an embodiment of the invention, the temperature sensor comprise a Negative Temperature Coefficient—NTC—resistor.

Another aspect according to the present invention relates to a yet further laundry appliance comprising a laundry drying chamber and a sensor for measuring the humidity of laundry items contained in the laundry drying chamber. Said sensor comprises at least one pad made of an electrically conductive material and being adapted to operate as a plate of a capacitor and a sensing arrangement provided for generating one or more electric signals accounting for a degree of humidity of the laundry items contained in the laundry drying chamber. The sensor further comprises a temperature sensor arranged for acquiring a temperature information exploited for correcting temperature-induced errors affecting the humidity measurements.

In an embodiment of the invention, the sensor further comprises a control circuitry configured for processing electric signals generated by the sensing arrangement. Preferably, the temperature sensor is comprised in, or is electrically connected to, the control circuitry of the sensor.

In an embodiment of the invention, the temperature sensor comprise a Negative Temperature Coefficient—NTC—resistor.

In an embodiment of the invention, the sensor further comprises an operating support having a first surface and a second surface opposite to the first surface. In addition, the at least one pad comprises at least one first pad provided on the first surface of the operating support and a respective at least one second pad provided on the second surface In an embodiment of the invention, each of said at least one first pad and a respective at least one second pad are arranged on the first surface and on the second surface, respectively, of the operating support so as to be substantially superimposed one to the other in a direction orthogonal to said first and second surfaced and separated by the operating support.

In an embodiment of the invention, the operating support comprises an electronic board comprising a respective metal layer provided at the first surface and at the second surface, the at least one first pad and the at least one second pad being provided by etching said metal layer provided at the first surface and at the second surface, respectively.

In an embodiment of the invention, the at least one first pad and the at least one second pad have substantially the same size and shape in plan view.

In an embodiment of the invention, at least one first track is formed on the operating support for electrically connecting the at least one first pad with the control circuitry. Further preferably, at least one second track is formed on the operating support for electrically connecting the at least one second pad with the control circuitry.

In an embodiment of the invention, the control circuitry is provided on the first surface of the operating support. Preferably, the sensor further comprises at least one via, the at least one via passing through the operating support from the first surface to the second surface and being electrically connected to the least one second track on the second surface and to the control circuitry on the first surface.

In an embodiment of the invention, the control circuitry comprises one or more electronic components arranged for filtering, amplifying, digitalizing, and/or otherwise manipulating the electric signals generated by the sensing arrangement.

In an embodiment of the invention, the control circuitry comprises one or more electronic components arranged for filtering, amplifying, digitalizing, and/or otherwise manipulating the electric signals generated by the temperature sensor.

In an embodiment of the invention, the laundry appliance further comprises a cabinet accommodating the laundry treatment chamber. Preferably, the cabinet comprises a front panel, and a cover plate mountable to the front panel, the cover plate comprising a housing for housing the sensor.

In an embodiment of the invention, the cover plate comprises an outer surface and an inner surface opposite to the outer surface, the outer surface facing towards the laundry items contained in the laundry treatment chamber and the inner surface facing the front panel once the cover plate is mounted to the front panel of the cabinet. Preferably, the housing is provided on the inner surface of the cover plate.

In an embodiment of the invention, the housing comprises a sidewall protruding from the inner surface of the cover plate. Preferably, the sidewall encloses the sensor once the latter is received in the housing.

In an embodiment of the invention, the at least one second pad provided on the second surface of the sensor is in contact with the inner surface of the cover plate when the sensor is positioned within the housing.

In an embodiment of the invention, the housing further comprises at least one retaining element engaging with the sensor and maintaining the sensor in position with the second surface of the sensor in contact with the inner surface of the cover plate.

In an embodiment of the invention, the laundry appliance further comprises a protective packaging surrounding the sensor. Preferably, the protective packaging insulates the sensor from moisture and foreign matters.

In an embodiment of the invention, the housing of the cover plate is sized for housing the sensor encapsulated in the protective packaging.

In an embodiment of the invention, the housing comprises a sidewall protruding from the inner surface of the cover plate, the sidewall enclosing the sensor once the latter is received in the housing, and the sidewall of the housing has a height equal to, or greater than, a thickness the sensor encapsulated in the protective packaging.

In an embodiment of the invention, the protective package comprises a potting encapsulation encapsulating the sensor, the potting encapsulation insulating the sensor from moisture and foreign matters.

In an embodiment of the invention, the potting encapsulation may comprise at least one insulating material, preferably a flowable insulating material. Preferably, the at least one insulating material comprises silicones, epoxies, polyesters, and urethanes.

In an embodiment of the present invention, the potting encapsulation is provided by injecting the at least one insulating material over the humidity sensor positioned in the housing. Preferably, the whole housing is filled with the insulating materials. Even more preferably, the insulating materials are deposited in the housing until are substantially flush with a free end of the perimeter sidewall.

In an embodiment of the invention, the sensor further comprises a connector interface electrically coupled with the control circuitry. Even more preferably, the connector interface receives wirings for allowing performing at least one between receiving electric power supply, and exchanging electric signals with the control unit of the laundry appliance.

In an embodiment of the invention, the connector interface comprises a connector device manufactured according to the Surface Mounting Technology and is mounted to one between the first surface and the second surface of the operating support.

In an embodiment of the invention, both the control circuitry and the connector interface are provided on the same surface between the first surface and the second surface.

In an embodiment of the invention, the connector interface may be provided protruding laterally from the electronic board. Preferably, the connector interface may be flush with the top and back surfaces and, respectively, of the operating support. Even more preferably, the connector interface is integral with the electronic board.

In an embodiment of the invention, the connector interface may comprise one or more, e.g. 4, electrically conductive pins (not shown) protruding laterally from a side of the electronic board. Preferably, the pins may be provided as a cantilevered structures or resting on a dielectric substrate also protruding from the operating support. Advantageously, the pins are adapted for being received in a respective connector.

In an embodiment of the invention, the wirings are welded directly to the connector interface.

In an embodiment of the invention, wherein the cover plate comprises a material and a thickness separating the outer surface from the inner surface which ensure that an amount of electrostatic charge acquired by the cover plate during the laundry appliance operation keeps a conductivity of the cover plate in an interval ranging from $10^{-14}$ S/cm to $10^{-11}$ S/cm.

Another aspect according to the present invention relates to another laundry appliance. The laundry machine comprises an electronic control unit configured for managing the operation of the laundry appliance, a laundry drying chamber, a sensor for measuring the humidity of laundry items contained in the laundry drying chamber. Said sensor comprising an operating support having a first surface and a second surface opposite to the first surface, at least one pad made of an electrically conductive material and being adapted to operate as a plate of a capacitor and a sensing arrangement provided for generating one or more electric signals accounting for a degree of humidity of the laundry items contained in the laundry drying chamber, the at least one pad being provided on one between the first and second surface of the operating support. The sensor further comprises a connector interface coupled with the operating support, the connector interface receiving wirings for allowing the sensor performing at least one between receiving electric power supply, and exchanging electric signals with the control unit of the laundry appliance. Preferably, the connector interface is arranged in such a way that at least one of the surfaces of the operating support has a substantially flat and even outline.

In an embodiment of the invention, the connector interface comprises a connector device manufactured according to the Surface Mounting Technology and is mounted to one between the first surface and the second surface of the operating support.

In an embodiment of the invention, the sensor comprises a control circuitry configured for processing, or at least pre-processing, electric signals generated by the sensing arrangement, both the control circuitry and the connector interface are provided on the same surface between the first surface and the second surface.

In an embodiment of the invention, the connector interface may be provided protruding laterally from the electronic board. Preferably, the connector interface may be flush with the top and back surfaces and, respectively, of the operating support. Even more preferably, the connector interface is integral with the electronic board.

In an embodiment of the invention, the connector interface may comprise one or more, e.g. 4, electrically conductive pins (not shown) protruding laterally from a side of the electronic board. Preferably, the pins may be provided as a cantilevered structures or resting on a dielectric substrate also protruding from the operating support. Advantageously, the pins are adapted for being received in a respective connector.

In an embodiment of the invention, the wirings are welded directly to the connector interface.

In an embodiment of the invention, each of said at least one first pad and respective at least one second pad are arranged on the first surface and on the second surface, respectively, of the operating support so as to be substantially superimposed one to the other in a direction orthogonal to said first and second surfaced and separated by the operating support.

In an embodiment of the invention, the at least one first pad and the at least one second pad have substantially the same size and shape in plan view.

In an embodiment of the invention, at least one first track is formed on the operating support for electrically connecting the at least one first pad with the control circuitry.

Further preferably, at least one second track is formed on the operating support for electrically connecting the at least one second pad with the control circuitry.

In an embodiment of the invention, the operating support comprises an electronic board comprising a respective metal layer provided at the first surface and at the second surface, the at least one first pad and the at least one second pad being provided by etching said metal layer provided at the first surface and at the second surface, respectively.

In an embodiment of the invention, the sensor further comprises at least one via, the at least one via passing through the operating support from the first surface to the second surface and being electrically connected to the least one second track on the second surface and to the control circuitry on the first surface.

In an embodiment of the invention, the control circuitry comprises one or more electronic components arranged for filtering, amplifying, digitalizing, and/or otherwise manipulating the electric signals generated by the sensing arrangement.

In an embodiment of the invention, the laundry appliance further comprises a cabinet accommodating the laundry treatment chamber. Preferably, the cabinet comprises a front panel, and a cover plate mountable to the front panel, the cover plate comprising a housing for housing the sensor.

In an embodiment of the invention, the cover plate comprises an outer surface and an inner surface opposite to the outer surface, the outer surface facing towards the laundry items contained in the laundry treatment chamber and the inner surface facing the front panel once the cover plate is mounted to the front panel of the cabinet. Preferably, the housing is provided on the inner surface of the cover plate.

In an embodiment of the invention, the housing comprises a sidewall protruding from the inner surface of the cover plate. Preferably, the sidewall encloses the sensor once the latter is received in the housing.

In an embodiment of the invention, the at least one second pad provided on the second surface of the sensor is in contact with the inner surface of the cover plate when the sensor is positioned within the housing.

In an embodiment of the invention, the housing further comprises at least one retaining element engaging with the sensor and maintaining the sensor in position with the second surface of the sensor in contact with the inner surface of the cover plate.

In an embodiment of the invention, the laundry appliance further comprises a protective packaging surrounding the sensor. Preferably, the protective packaging insulates the sensor from moisture and foreign matters.

In an embodiment of the invention, the sidewall of the housing has a height equal to, or greater than, a thickness the sensor encapsulated in the protective packaging.

In an embodiment of the invention, the protective package comprises a potting encapsulation encapsulating the sensor, the potting encapsulation insulating the sensor from moisture and foreign matters.

In an embodiment of the invention, the potting encapsulation may comprise at least one insulating material, preferably a flowable insulating material. Preferably, the at least one insulating material comprises silicones, epoxies, polyesters, and urethanes.

In an embodiment of the present invention, the potting encapsulation is provided by injecting the at least one insulating material over the humidity sensor positioned in the housing. Preferably, the whole housing is filled with the insulating materials. Even more preferably, the insulating materials are deposited in the housing until are substantially flush with a free end of the perimeter sidewall.

In an embodiment of the invention, wherein the cover plate comprises a material and a thickness separating the outer surface from the inner surface which ensure that an amount of electrostatic charge acquired by the cover plate during the laundry appliance operation keeps a conductivity of the cover plate in an interval ranging from $10^{-14}$ S/cm to $10^{-11}$ S/cm.

In an embodiment of the invention, the sensor further comprises a temperature sensor arranged for acquiring a temperature information exploited for correcting temperature-induced errors affecting the humidity measurements.

In an embodiment of the invention, the sensor further comprises a control circuitry configured for processing electric signals generated by the sensing arrangement. Preferably, the temperature sensor is comprised in, or is electrically connected to, the control circuitry of the sensor.

In an embodiment of the invention, the temperature sensor comprise a Negative Temperature Coefficient—NTC—resistor.

BRIEF DESCRIPTION OF THE DRAWINGS

FIGS. 4A and 4B are front and rear plane views of the humidity sensor according to an embodiment of the invention;

DETAILED DESCRIPTION OF EXEMPLARY AND NON-LIMITATIVE EMBODIMENTS OF THE PRESENT INVENTION

Figure 1:
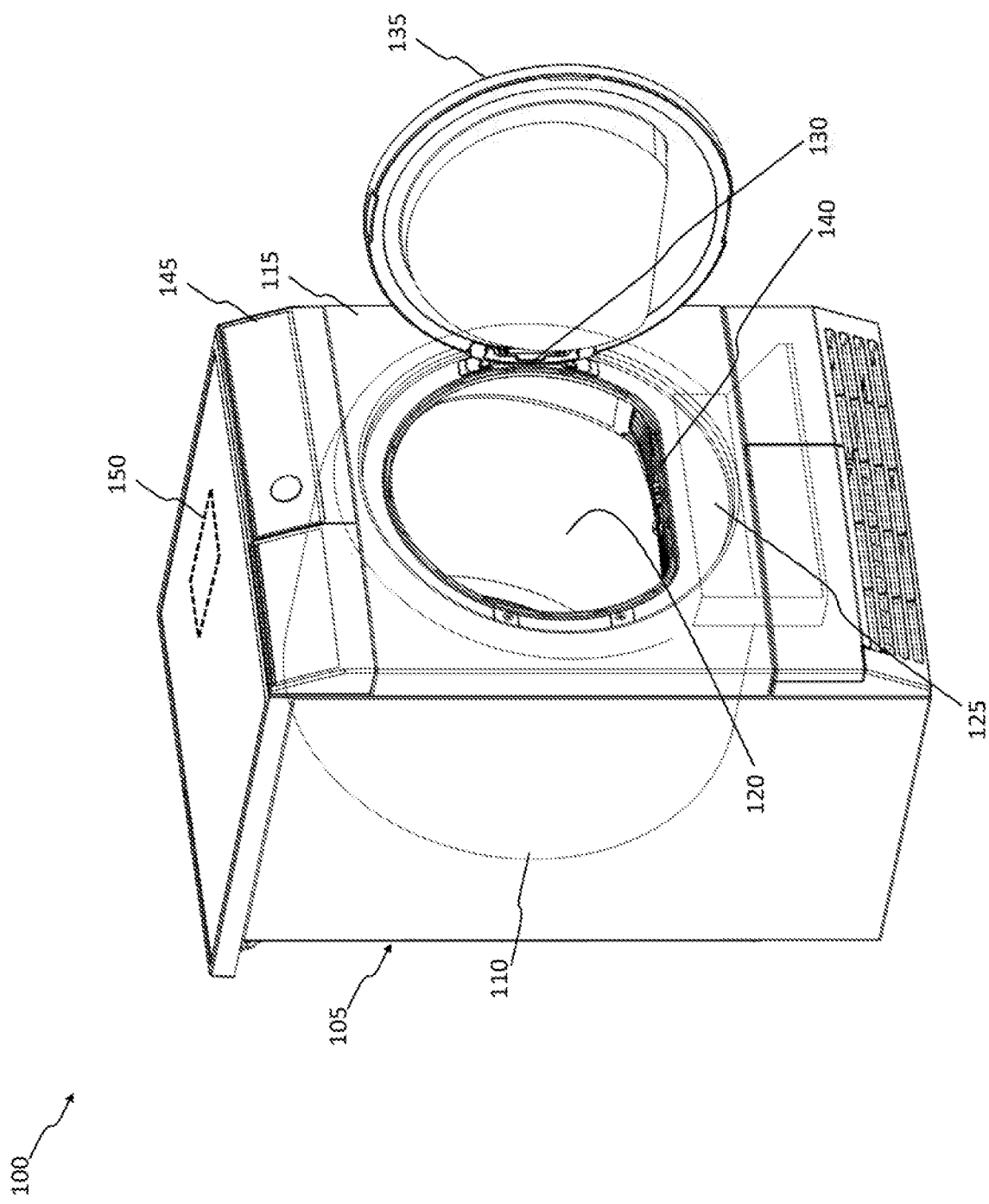
FIG. 1 is a perspective view a laundry appliance according to an embodiment of the present invention.

With reference to the drawings, in FIG. 1 there is shown in a perspective view a laundry appliance 100 according to an embodiment of the present invention, for example, although not limitatively, a laundry dryer, particularly a tumble drier. It is pointed out that although here and in the following description reference is made to a laundry dryer, this is not to be construed as a limitation, because the present invention also covers and applies to combined laundry washers and dryers (i.e., laundry washing machines also having a laundry drying function).

The laundry dryer 100 comprises a cabinet 105, for example parallelepiped-shaped. The cabinet 105 accommodates therein a laundry treatment chamber (laundry drying chamber in the example here considered of a laundry dryer) for the laundry mass, i.e. one or more laundry items, to be dried. The laundry drying chamber is for example defined by the inner space of a, preferably rotatable, drum 110 which is adapted to contain the laundry items to be dried (in a combined laundry washer and dryer appliance, the laundry treatment chamber comprises a washing basket or drum which is contained in a washing tub). The cabinet 105 also encloses the electrical, electronic, mechanical, and hydraulic components necessary for the operation of the laundry dryer 100. A front panel 115 of the cabinet 105 has a loading opening 120 providing an access to the drum 110 for loading/unloading the laundry items to be dried. The loading opening 120 has a rim 125, preferably substantially annular, in which door hinges 130 as well as door locking means (not shown) are arranged for, respectively, hinging and locking a door 135. The door 135 is adapted for sealably closing the loading opening 120 during the appliance operation.

The laundry dryer 100 comprises a drying air circuit, for causing drying air to circulate through the drum 110 where the laundry to be dried is loaded. The drying air circuit is not shown in the drawings, not being of relevance for the understanding of the present invention. Any known drying air circuit can be adopted, for example an open-loop drying air circuit (in which drying air is: taken in from the outside ambient, heated up, caused to flow through the drum 110 to extract moisture from the laundry to be dried, then possibly de-moisturized and cooled down and finally exhausted to the outside ambient) or a closed-loop drying air circuit (in which the drying air is: heated up, caused to flow through the drum 110 to extract moisture from the laundry to be dried, de-moisturized and cooled down, and then again heated up and reintroduced in the drum). The drying air circuit for de-moisturizing, cooling system and condensing may comprise an air-air heat exchanger or a heat pump exploiting a suitable refrigerant fluid. The drying air heater can comprise a Joule-effect heater; in case of use of a heat pump, one of the heat exchangers of the heat pump is used to cool down the moisture-laden drying air, while another heat exchanger of the heat pump can advantageously be exploited for heating the drying air.

The drying air circuit can for example be designed such that the drying air is introduced into the drum 110 at or proximate to the rear portion thereof (rear with respect to the machine front, corresponding to the front panel 115). After flowing through the drum 110 (and hitting the laundry items contained therein), the drying air can leave the drum 110 passing through an air-opening 140 provided close to the rim 125 of the loading opening 120, on the inner side thereof (i.e., looking the machine frontally, behind the rim 125 of the loading opening 120).

In addition, a user interface 145 may be advantageously provided, preferably, although not limitatively, on the front panel 105. Preferably, the user interface 145 may comprise one or more buttons and/or knobs that allow a user selecting laundry treatment cycles (e.g., a set of operations and parameters designed for treating peculiar fabrics, such as wool items) to be carried out by the laundry appliance 100.

The laundry appliance 100 is further provided with a control unit 150 (schematically denoted as a dashed rectangle in FIG. 1), e.g. comprising at least one electronic board on which a main control circuitry is provided. The main control circuitry may comprise one or more microprocessors/microcontrollers, an application-specific integrated circuit—ASIC—or a similar electronic control component and, possibly, further processing circuitry such as a Digital Signal Processor—DSP—, etc.) adapted to control the laundry appliance 100 operation according to instructions received by a user through the user interface 145, which is preferably, although not necessarily, placed in a top position inside the casing in order to be less prone to contacts with liquids or humidity possibly leaking from the drum 110.

For example, the control unit 150 provides power and interacts with the electrical/electronic/electromechanical components comprised in the laundry appliance 100—such as for example drum motor, electromechanical valves, pumps and impellers of the hydraulic apparatus, one or more heating elements for heating water/washing liquids/air, the user interface 145, etc.—in order to manage an execution of selected laundry-treating operations.

The laundry dryer 100 according to the present invention is equipped with a laundry items drying degree sensing function, advantageously exploited for controlling the progress of the laundry drying process. The laundry items drying degree sensing function comprises a system for measuring the humidity degree of the laundry items to be dried (described in the following).

Figure 2:
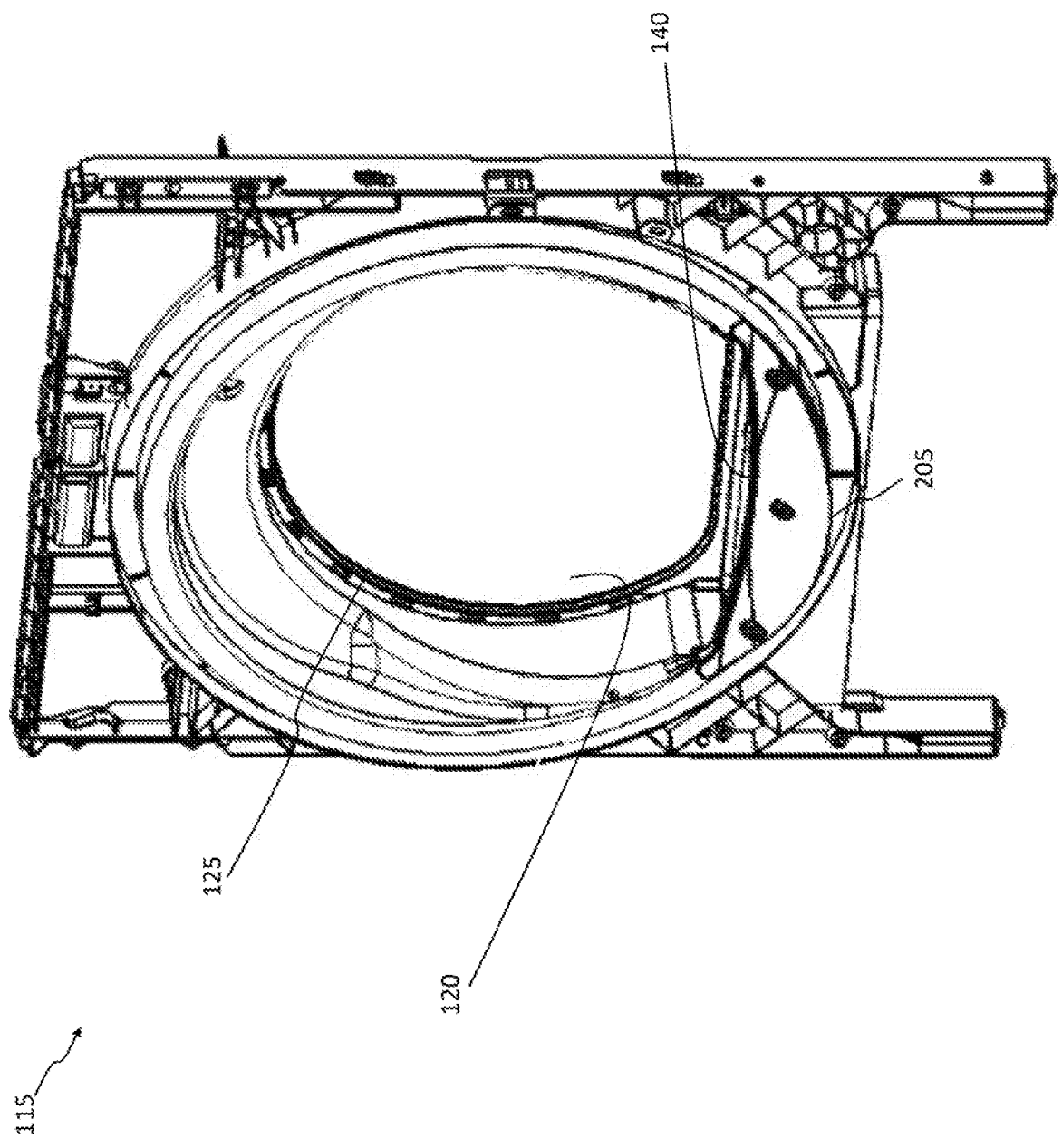
FIG. 2 is a perspective view of a front panel of the laundry appliance according to an embodiment of the present invention.

FIG. 2 is a view of the front panel 115 from behind, showing the inner side of the loading opening rim 125, facing towards the drum 110 (in FIG. 2, the front panel 115 is shown dismounted from the rest of the cabinet 110). There is shown a cover member, e.g. a cover plate 205, that is mounted to the inner side of the cabinet front panel 115, in the shown example just below the rim 125 of the loading opening 120, so as to face the drum 110 and, in operation, being in front of the laundry items to be dried that, while it tumbles inside the drum 110, falls by gravity to the bottom of the drum 110. Preferably, the cover plate 205 is made of a dielectric material, e.g. plastic.

According to an embodiment of the invention, the cover plate 205 is arranged for housing at least part of the system for measuring the humidity degree of the laundry items to be dried according to an embodiment of the present invention.

Figure 3A:
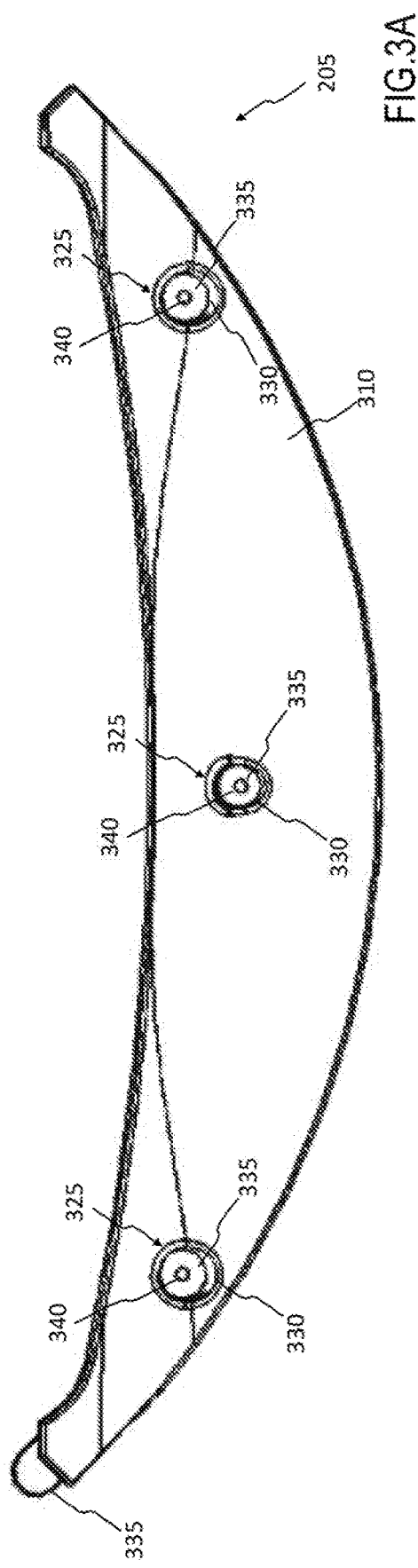
FIGS. 3A and 3B are front and rear perspective views of a cover plate of the front panel which is adapted to house a humidity sensor according to an embodiment of the invention.
Figure 3B:
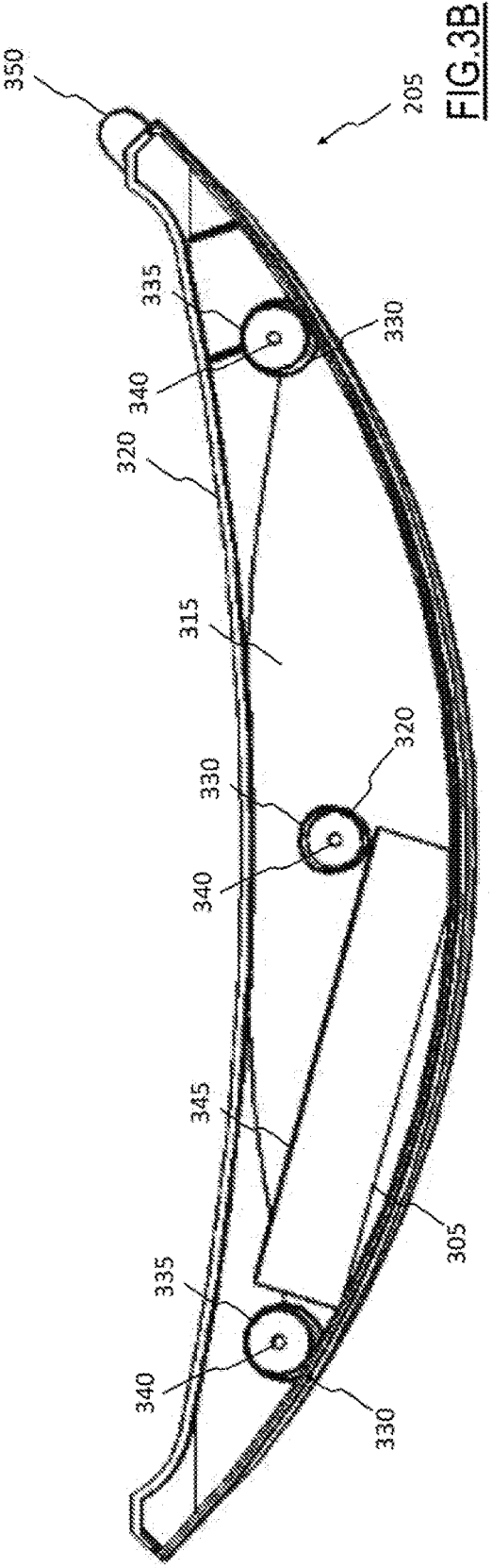

For example, FIGS. 3A and 3B are front and rear perspective views of cover plate 205 of the front panel 105 adapted to house a humidity sensor (not shown in FIGS. 3A and 3B but visible in FIGS. 4A and 4B where it is denoted by the reference 400) according to an embodiment of the invention.

Preferably, the cover plate 205 has a structure that, when the cover plate 205 is connected to the front panel 105, defines a hollow space separated from the inner space of the cabinet 105 in which the drum 110 is contained.

Even more preferably, the cover plate 205 connects to the front panel 105 in a substantially watertight manner, thus defining a hollow space sealed from the inner space of the cabinet 105 in which the drum 110 is contained.

The hollow space defined by the cover plate 205 connected to the front panel 105 is adapted to operatively house the humidity sensor 400. Preferably, the cover plate 205 comprises a housing 305 arranged for housing the humidity sensor 400 (as described in the following).

Therefore, the humidity sensor 400 is substantially insulated from the inner space of the cabinet 105 in which the drum 110 is contained in its operating position (i.e., within the hollow space defined by the cover plate 205 and the front panel 105).

In the example of FIGS. 3A and 3B, the cover plate 205 is shaped substantially as a circular segment, e.g. resembling a stylized 'smile', in plan view.

Particularly, the cover plate 205 comprises a (first) outer surface 310 and a (second) inner surface 315 opposite to the former.

A sidewall 320 protrudes from a periphery of the cover plate 205 on the side of the inner surface 315 and substantially transversal thereto.

The sidewall 320 is adapted to abut and/or engage with a portion of the front panel 105. The sidewall 320 is designed for coupling with the cover plate 205 (as visible in FIG. 2) determines, at least partially, a height of the hollow space delimited by the cover plate 205 and the front panel 105.

The cover plate 205 further comprises on or more fastening receptacles, such as three fastening receptacles 325 shown in the FIGS. 3A and 3B, which are adapted to receive a fastener (not shown in the figures) for fastening the cover plate 205 to the front panel 105.

In the example of FIGS. 3A and 3B, each fastening receptacles 325 comprises a receptacle sidewall 330, preferably cylindrical, that protrudes from the inner surface 315 and a receptacle base 335 at a free end of the receptacle sidewall 325.

In other words, each fastening receptacles 325 defines a substantially cylindrical depression extending from the outer surface 310.

In addition, each fastening receptacle 325 comprises a fastener receiver, such as a through bore 340 in the example of FIGS. 3A and 3B, which is adapted to receive a fastener (not shown in the figures such as a screw, a pin, a peg etc.). The fastener receivable by the through bore 340 is adapted to engage with a corresponding receiver (not shown) provided on the front panel 105 in order to connect the cover plate 205 to the front panel 105.

The housing 305 for the humidity sensor 400 of the cover element 205 comprises a perimeter sidewall 345, which protrudes from the inner surface 315 of the cover plate 205 and has a predetermined height (from the inner surface 315).

Preferably, the perimeter sidewall 345 has a size and a layout suitable for enclosing the humidity sensor 400; for example (as shown in FIG. 3B), the perimeter sidewall 345 has a substantially rectangular layout and a size that allows the perimeter sidewall 345 enclosing the rectangular-shaped humidity sensor 400.

Figure 8:
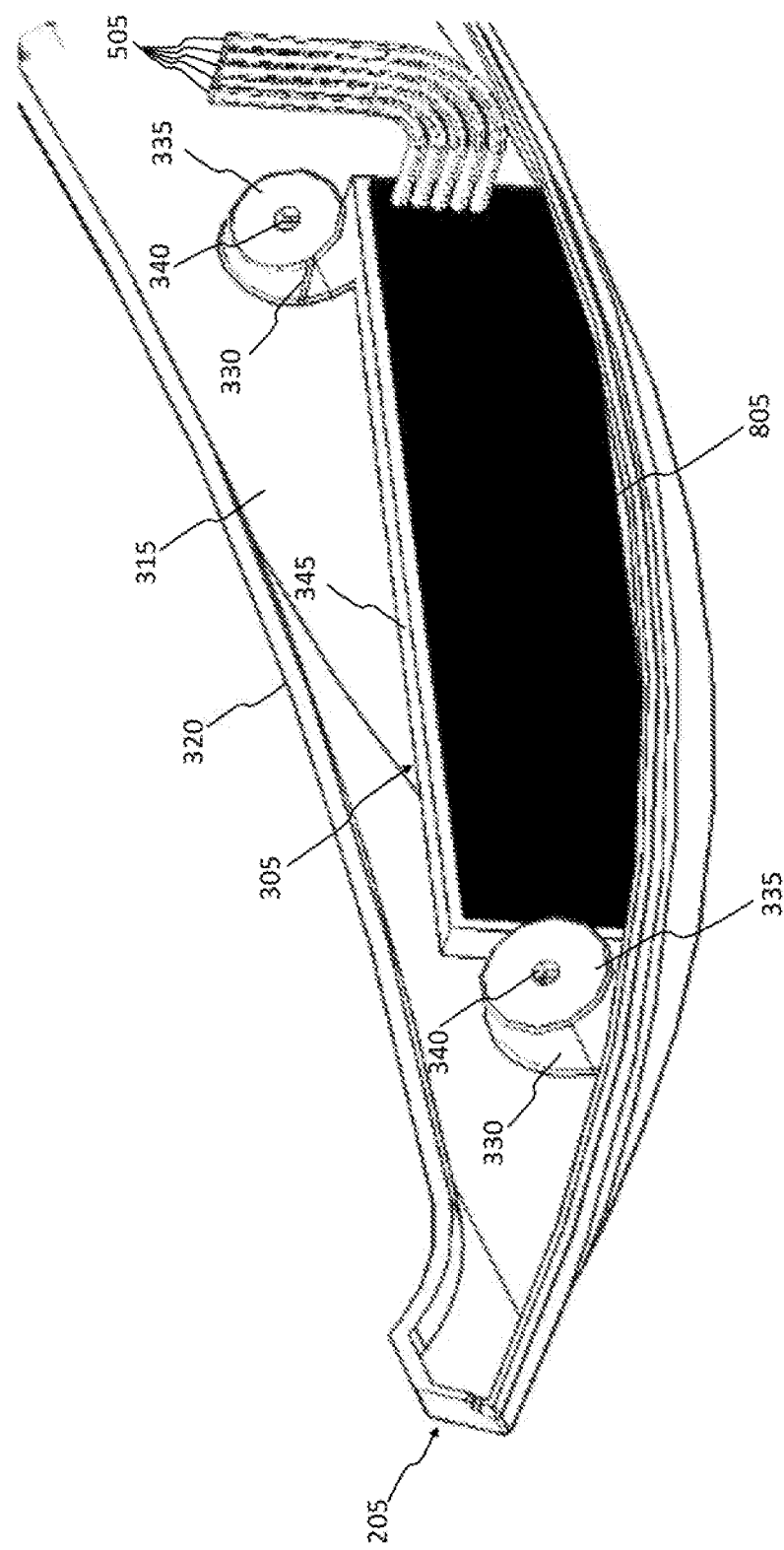
FIG. 8 is a perspective detail view of the cover plate of FIGS. 3A and 3B housing the humidity sensor of FIGS. 4A and 4B covered with a potting insulation.

Moreover, the perimeter sidewall 345 has a height arranged for containing the whole humidity sensor 400 and, preferably, also a protective package, such as for example a potting insulation (not shown in FIG. 3B, but visible in FIG. 8 where is denoted by reference 805 and therein described).

Additionally, the cover plate 205 may further comprise a coupling tab 350 designed for engaging a corresponding receptacle or hole in the front panel 105 in order to prevent a wrong coupling between the cover plate 205 and the front panel 105 and to provide a further stability to the connection of the cover plate 205 with the front panel 105.

In one embodiment of the invention, structural and physical properties of the cover plate 205 are selected in such a manner to avoid alterations in measurements performed by the humidity sensor 400.

Particularly, the material selected for the cover plate 205 should be selected that its hygroscopic property (i.e., the ability of a substance to attract and hold water molecules from the surrounding environment) and a relative permittivity (the resistance of the material opposed to the formation of an electric field) are suitable for preventing, or at least limiting, alterations to the measurements performed by the humidity sensor 400.

For example, the Applicant has found that a suitable material for the cover plate 205 may be Carboran.

Moreover, a thickness of the cover plate 205—particularly a thickness defining the distances between the outer surface 310 and the inner surface 315 thereof—should be selected in order to suppress, or at least controlling, any effects on the measurements performed by the humidity sensor 400.

For example, in the case of Carboran a thickness ranging from 1.5 mm to 2.5 mm, preferably 2 mm, provides a suitable trade-off between user safety (i.e., electrostatic/electric discharge hazard lowers as the thickness of the cover plate 205 grows) and sensitivity of the humidity sensor (shown in FIG. 4 wherein is denoted by reference 400; i.e., sensitivity drops as the thickness of the cover plate 205 grows)

For example, the structural and physical properties of the cover plate 205 should be selected in order to ensure a reduced amount electrostatic charge acquired by the cover plate 205 during the laundry appliance operation 100 (e.g., produced by a friction between laundry items in the drum 110 and the cover plate 205).

In an embodiment of the invention, the structural and physical properties of the cover plate 205 are selected in order that an amount of electrostatic charge acquired by the cover plate 205 during the laundry appliance 100 operation maintains a conductivity of the cover plate in an interval ranging from $10^{-14}$ S/cm to $10^{-11}$ S/cm (i.e., a resistivity ranging from $10^{11}$ to $10^{14}$ Ω·cm).

Particular, the conductivity of the cover plate 205 should be selected sufficiently large in order to avoid affecting the electric field in generated during the operation (described in the following with respect to FIGS. 4-6) of the humidity sensor (shown in FIG. 4 wherein is denoted by reference 400), but sufficiently small in order to avoid that the cover plate 205 acts as a spurious capacitor plate.

Indeed, having the cover plate 205 with a too large conductivity ($>10^{-11}$ S/cm) may deviate lines of the electric field generated by the humidity sensor (as described in the following) up to the point that such lines of the electric field would close on the cover plate 205 preventing a correct evaluation of laundry humidity. Conversely, the cover plate 205 with a too small conductivity ($<10^{-14}$ S/cm) tend to accumulate electric charges, i.e. the cover plate 205 operates as a (spurious) capacitors plate which prevents a correct evaluation of laundry humidity by the humidity sensor.

In the solution according to embodiments of the present invention, the system for measuring the humidity degree of the laundry items to be dried comprises the humidity sensor 400 (mentioned above) shown in FIGS. 4A and 4B, which are front and rear plan views, respectively, thereof.

The humidity sensor 400 comprises an electronic capacitive humidity sensor, i.e. a humidity sensor arranged for sensing capacitance and/or capacitance variations associated with humidity of, and/or humidity changes in, the laundry to be dried contained in the rotating drum 110.

According to an embodiment of the invention, the humidity sensor 400 comprises an operating support, such as an electronic board 405 (e.g., a Printed Circuit Board, or PCB) on which a sensing arrangement 410 in the example of the FIGS. 4A and 4B, a (dedicated) control circuitry 415 and a connector interface 420 are provided.

Preferably, the sensing arrangement 410 comprises one or more top pads 425 (four in the example of FIGS. 4A and 4B) provided on a top surface 405a of the electronic board 405 and one or more back pads 430 (four in the example of FIGS. 4A and 4B) provided on a back surface 405b of the electronic board 405.

The top pads 425 and the back pads 430 are both made of an electrically conductive material, such as for example aluminum or copper.

Particularly, the top pad 425 and the back pad 430 have substantially the same shape, square in the example the FIGS. 4A and 4B, and substantially the same size. Preferably, the top pad 425 and the back pad 430 are provided substantially superimposed one to the other (at least in plan view), but separated by the electronic board 405 (or at least by a dielectric portion of the electronic board 405).

In an embodiment of the invention, each top pad 425 and each back pad 430 may be made by using a respective metal layer of the electronic board 405 (e.g., in case of a PCB).

Particularly, metal layers provided on the top surface 405a and on the back surface 405b of the electronic board 405 (mainly provided for implementing conductive tracks coupling electronics components arranged on the electronic board 405) may be etched (chemically and/or mechanically) in order to define top pads 425 and back pads 430.

Preferably, although not strictly necessarily, both the control circuitry 415 and the connector interface 420 are provided on the same surface, such as the top surface 405a, of the electronic board 405.

More preferably, the connector interface 420 may be provided protruding laterally from the electronic board 405. According to an embodiment of the invention (not shown in the drawings), the connector interface 420 may be flush with the top and back surfaces 405a and 405b, respectively, of the electronic board 405. Possibly, the connector interface 420 may be integral with the electronic board 405.

Each top pad 425 and the back pad 430 of sensing arrangement 410 is electrically connected to the control circuitry 415.

For example, each top pad 425 is electrically connected to the control circuitry 415 by means of a respective top (conductive) track 435 provided on the top surface 405a of the electronic board 405 (as shown in FIG. 4A). Each back pad 430 is electrically connected to the control circuitry 415 by means of a respective back (conductive) track 440 provided on the back surface 405b of the electronic board 405 and a respective (conductive) via 445 (as shown in FIG. 4B), which crosses the electronic board from the back surface 405b to the top surface 405a in order to electrically connect the respective back track 440 (and, therefore, the corresponding back pad 430 of the capacitor 410) to the control circuitry 415 provided on the top surface 405a.

The control circuitry 415 is further electrically connected to the connector interface 420, by means of one or more conductive tracks, a single track 450 being shown in FIG. 4A.

The connector interface 420 is adapted to electrically and, preferably, mechanically couple with one or more wirings (not shown in FIG. 4A, but visible in FIG. 5 and denoted by the reference 505 therein) for operatively coupling the humidity sensor with the control unit 150 of the laundry appliance 100.

The connector interface 420 may be implemented with various arrangements.

For example, a connector device manufactured according to the Surface Mounting Technology (i.e., a Surface Mounting Device—SMD) is provided on the electronic board 405.

Alternatively, the wirings 505 may be welded directly to the electronic board 405 and electrically coupled with the control circuitry 415 by means of the track 450. Preferably, the wirings 505 are also connected to the control unit 150 of the laundry appliance 100. The wirings 505 allows the control unit 150 supplying electric power to the humidity sensor 400 and allows exchanging one or more data signals (e.g., sensing settings, humidity data, etc.) between the control unit 150 and the humidity sensor 400.

As a further alternative, the wirings 505 may be welded directly to the electronic board 405 and electrically coupled with the control circuitry 415 by means of the track 450. Preferably, a free end of the wirings 505 (not shown in the figures) is connected to a flying connector (i.e., a connector device, not shown in the figures). The flying connector is connected to a matching flying connector attached to a cable in its turn connected to the control unit 150.

In case a laterally protruding connector interface is provided, the connector interface 420 may comprise one or more, e.g. 4, electrically conductive pins (not shown) protruding laterally from a side of the electronic board 405. The pins may be provided as a cantilevered structures or resting on a dielectric substrate also protruding from the electronic board 405.

Preferably, the pins are adapted for being received in a respective connector—for example, provided at a free end of an electrical cable coupled with the control unit 150—, although nothing prevents from operatively coupling (e.g., soldering) a respective wire to each one of the pins of the connector interface 420.

According to an embodiment of the present invention, the control circuitry 415 of the humidity sensor 400 is configured for processing, or at least pre-processing, electric signals generated by the sensing arrangement 410 (which are based in a humidity of the laundry stored in the rotating drum 110) during the laundry appliance 100 operation. For example, the control circuitry may comprise one or more electronic components (such as for example, one or more microprocessors, microcontrollers, application-specific integrated circuits—ASICs—, Digital Signal Processors—DSPs—, and/or other electronic components such as memory elements etc.) arranged for filtering, amplifying and digitalizing, and/or otherwise manipulating electric (analogic) signals provided by the sensing arrangement 410 prior to providing such electric signals to the control unit 150 of the laundry appliance 100 by forwarding electronic (preferably digital) signals, based on the processing or pre-processing of the electric signals mentioned above, through the wirings 505 connected to the connector interface 420 of the humidity sensor 400.

Preferably, the humidity sensor 400 further comprises on or more fastening element, such as one or more through holes—two fastening through holes 455 are shown in FIGS. 4A and 4B—are provided in the electronic board 405. Such fastening through holes 455 are provided for allowing the humidity sensor 400 to be fastened to the cover plate 205 (as described in the following).

Figure 5:
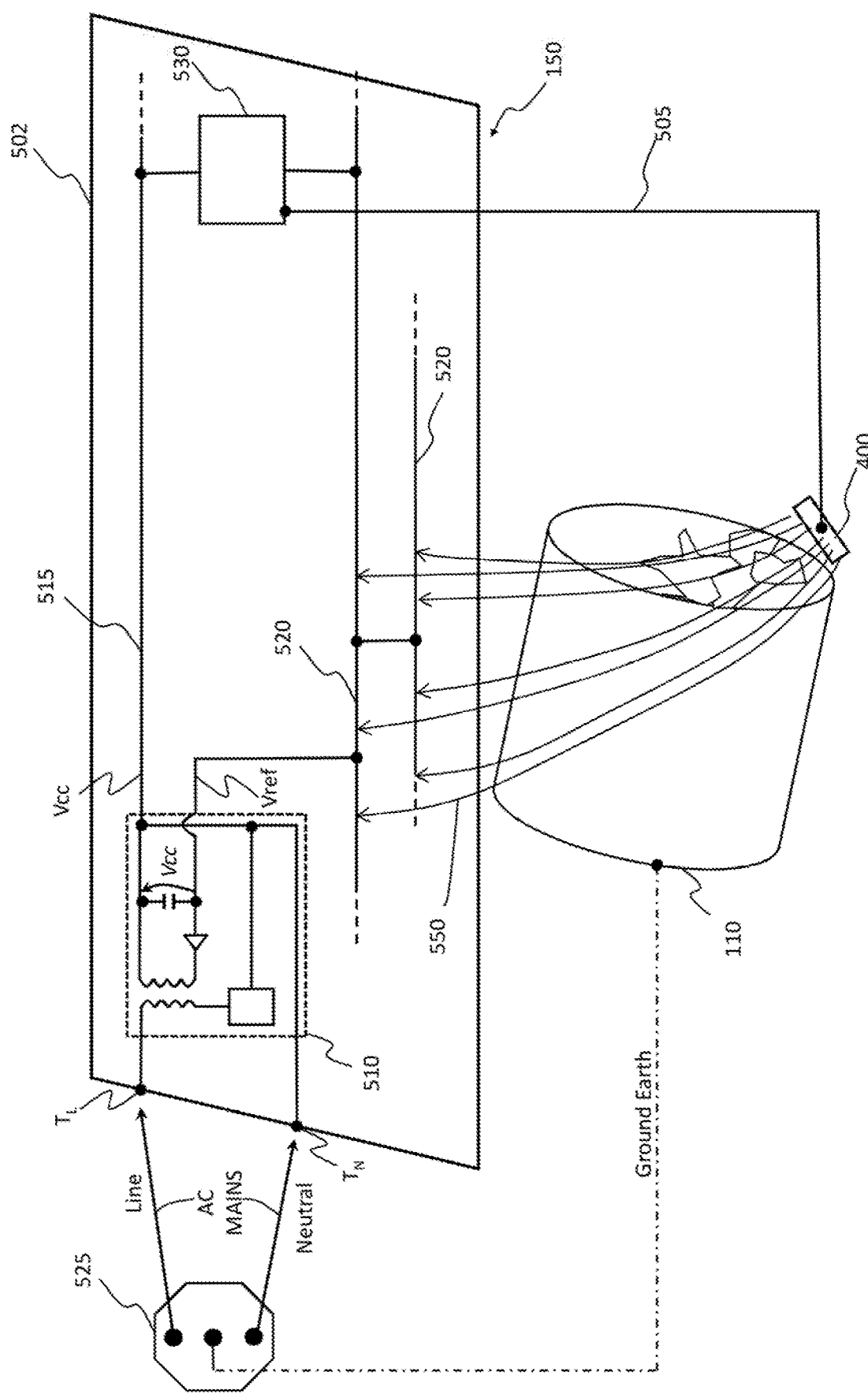
FIG. 5 schematically shows, partly in terms of functional blocks, a system for measuring the humidity degree of the laundry mass to be dried according to an embodiment of the present invention.
Figure 6:
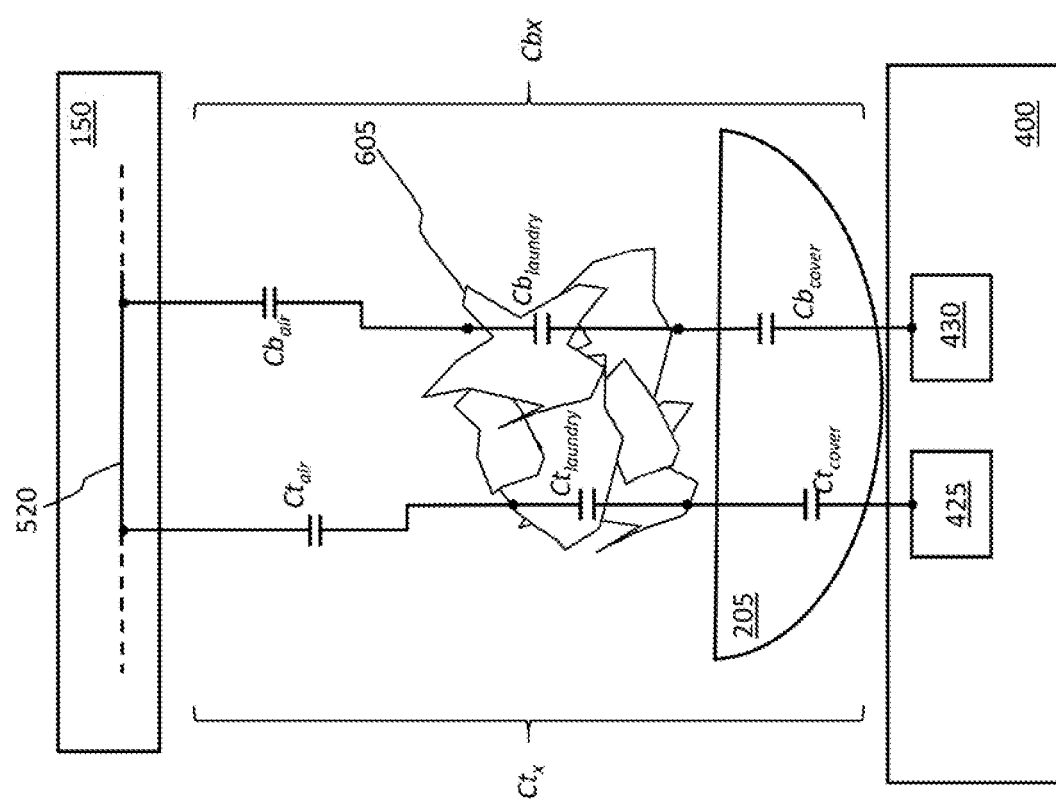
FIG. 6 schematizes capacitance components comprised in a total capacitance measured by the system for measuring the humidity degree according to an embodiment of the present invention.

The pictorial schematic of FIG. 5 is useful to understand the system for measuring the humidity degree of the laundry items to be dried according to an embodiment of the present invention.

Reference numeral 502 denotes an electronic board, such as for example a Printed Circuit Board (PCB), or a plurality (system) of PCBs, belonging to the control unit 150 of the laundry appliance 100, shown schematically and with only a few of the (several other) electronic/electromechanical components actually present in the laundry appliance 100.

A DC (Direct Current) power supply generation circuit 510 generates the DC electric potentials for supplying the electronics. In particular, for what is relevant here, the DC power supply generation circuit 510 generates two DC electric potentials Vcc and Vref, where the value of the electric potential Vcc, being the supply voltage for the electronics, is equal to the value of the electric potential Vref, being the reference voltage for the electronics, plus a nominally constant value Vcc which is typically 5 V, or 3.3

V, or less, depending on the families of Integrated Circuits to be power supplied. The two DC electric potentials Vcc and Vref are distributed, i.e. routed, through the PCB (or plurality of PCBs) 502 by means of a system of conductive tracks, comprising conductive tracks 515 for routing the electric potential (supply voltage) Vcc, and conductive tracks 520 for routing the electric potential (reference voltage) Vref, so as to be brought to the locations, on the PCB 502, where electronic components are placed. In alternative embodiments, conductive wires may replace the conductive tracks 515 and/or the conductive tracks 520.

The DC power supply generation circuit 510 generates the two DC electric potentials Vcc and Vref starting from an AC voltage (e.g., 230 V @ 50 Hz, or 110 V @ 60 Hz) supplied by an AC power distribution network to the premises of the users. Electric terminals $T_L$ and $T_N$ on the PCB 502 receive a line AC voltage Line and a neutral AC voltage Neutral when the appliance is plugged to an AC main socket 525. The DC power supply generation circuit 510 comprises transformers, condensers, rectifiers, and DC voltage regulators. The AC main socket 525 (and the appliance plug) also has a ground earth contact providing a ground earth potential. In order to comply with safety prescriptions imposing that the user must not receive electric shocks in case he/she touches any part of the appliance that can be at the reach of the user body, such appliance parts are kept to the ground earth potential. It is pointed out that the electric potential (reference voltage) Vref for the electronics is typically not equal to the ground earth potential. In some embodiments, the machine could even have no connection to the ground earth potential (Class II machines), this not affecting the implementation of the solution according to the present invention.

In particular, the DC electric potentials Vcc (supply voltage) and Vref (reference voltage) are routed and supply DC power to an main control circuitry, schematized as a functional block 530, that governs the appliance operation.

The DC electric potentials Vcc and Vref are routed, and supply DC power is thus fed, to the humidity sensor 400 through the wirings 505. For example, the wirings 505 may comprise a first wire for providing the DC electric potential Vcc and a second wire for providing the DC electric potential Vref to the humidity sensor 400.

Advantageously, the wirings 505 allows an exchange of electrical signal between the humidity sensor 400 and the main control circuitry 530 of the control unit. For example, one or more wires of the wirings 505 may be provided for allowing the exchange of electric signals between signal between the humidity sensor 400 and the main control circuitry 530. Preferably, the capacitance variations detected by the humidity sensor 400 are analyzed for deriving information about the degree of humidity of the laundry items being dried that are provided to the main control circuitry 530 for, possibly, adapting the on-going drying program on the go, based on the detected conditions of humidity of the laundry items.

The information about the degree of humidity of the laundry items provided by the humidity sensor 400 can also be used also before starting a drying phase of a drying process to estimate the amount of water contained in the laundry items to be dried, i.e. before removing water from laundry. Such information can be used by the main control circuitry 530 of the control unit 150 to determine control parameters that will be used during the following drying process for drying laundry It should be noted that the top pads 425 and back pads 430 may be used either individually or in combination (as described in the following) as plates of one or more respective capacitors comprising at least part the control unit 150 exploited as a complementary plate and with the laundry items comprised the drum 110 corresponding to, at least part of, the dielectric between the plates.

In particular, according to an embodiment of the present invention, the humidity sensor 400 is configured to implement a self-capacitance sensing method, schematized in FIG. 5. Essentially, in the self-capacitance sensing method according to the present invention, the capacitances between top pads 425 and back pads 430, and a reference electric potential is measured.

Preferably, the reference electric potential is the DC reference voltage Vref at the control unit 150.

In one embodiment of the invention, the humidity sensor 400 drives a current to each one of the top pads 425 and/or of the back pads 430 and measures the respective voltages Vtx and Vbx (referred to the DC reference voltage Vref) that develops across the unknown capacitance(s) Ctx (between the DC reference voltage Vref and each one of the top pads 425) and across the unknown capacitance(s) Cbx (between the DC reference voltage Vref and each one of the back pads 430) whose values are to be determined.

In FIG. 5, thin curves 550 schematize the electric field lines that start at the top pads 425 and/or back pads 430 on the humidity sensor 400 and end at the conductive tracks 520 that, in the PCB (or plurality of PCBs) 505, route the reference electric potential Vref.

It is pointed out that the electric field lines do not end at the drum 110, because the drum 110 is not at the DC reference voltage Vref, being instead at a different electric potential. In particular, the actual electric potential of the drum 110 may depend on the circumstances, and it is not necessarily the ground earth potential. For example, let it be supposed that the drum 110 is driven by a belt (which, due to the material of which it is made, has a certain electric impedance). The belt, through pulleys, is driven by an electric motor, which, for safety prescriptions, is kept to the ground earth. Thus, in this example the drum 110 may be connected to the ground earth, but (due to the impedance of the belt) is at a potential different from the ground earth. At the same time, the drum 110 is not at the DC reference voltage Vref, which, as pointed out in the foregoing, is typically not the ground earth FIG. 6 schematizes capacitance components comprised in a total capacitance measured by the system for measuring the humidity degree according to an embodiment of the present invention. References $Ct_x$ and $Cb_x$ denotes the capacitors whose unknown capacitances Ox and Cbx, respectively, is to be determined. The capacitors $Ct_x$ and $Cb_x$ have a dielectric that is substantially formed by: the cover plate 205 (with capacitive components $Ct_{cover}$ and $Cb_{cover}$), laundry items 605 (with capacitive components $Ct_{laundry}$ and $Cb_{laundry}$) contained in the drum 110, and air 510 (with capacitive components $Ct_{air}$ and $Cb_{air}$) in the laundry appliance 100.

Each capacitor $Ct_x$ and $Cb_x$ have a (first) plate formed by a respective top pad 425, or back pad 430, provided on the humidity sensor 400. The other (second) plate of each capacitor $Ct_x$ and $Cb_x$ is a virtual plate. The virtual plates are constituted by the reference electric potential (reference voltage) Vref that is routed by conductive tracks 520 in the PCB 502.

Since the permittivity of the laundry items housed in the drum 110 varies considerably according to the laundry items humidity, the capacitances Ctx of the capacitors $Ct_x$ (each top pad 425 defining a corresponding capacitor $Ct_x$) and the capacitances $Cb_x$ of the capacitors $Cb_x$ (each back pad 430 defining a corresponding capacitor $Cb_x$) varies according to a degree of humidity of the laundry items in the drum 110. By sensing the capacitances Ctx and Cbx of the capacitors $Ct_x$ and $Cb_x$ an indication of the laundry items humidity degree can be derived.

Methods for measuring capacitances are known in the art.

Some known methods for measuring capacitances make use of a switched capacitor network comprising the capacitors $Ct_x$ and $Cb_x$ whose unknown capacitances Ctx and Cbx are to be determined, a reference capacitor of known capacitance (not shown, for example comprised in the control circuitry 415 of the humidity sensor 400 and, possibly, larger than the unknown capacitance to be determined), and an arrangement of switches (not shown, for example comprised in the control circuitry 415 of the humidity sensor 400).

One known capacitance measuring method using a switched capacitor network is the "charge transfer" method: the capacitors $Ct_x$ and $Cb_x$ (whose unknown capacitances Ctx and Cbx are to be determined) are repeatedly charged to the voltage of a voltage source, and its charge is then transferred to a reference capacitor.

By counting the number of times the capacitors $Ct_x$ and $Cb_x$ need to be charged and their charge transferred to the reference capacitor until the latter is charged up to a threshold (voltage) value (or by measuring the time needed to charge the reference capacitor up to the threshold voltage value), it is possible to derive the value of the unknown capacitance. Preferably, countermeasures are taken for increasing the immunity against noise, like for example averaging.

Another known measuring method using a switched capacitor network is the "sigma-delta modulation" method. Differently from the charge transfer method, the reference capacitor is not charged from an initial voltage to a threshold (reference) voltage, rather, the voltage across the reference capacitor is modulated about the reference voltage in charge up and charge down steps. The capacitors $Ct_x$ and $Cb_x$ (whose unknown capacitances $Ct_x$ and $Cb_x$ are to be determined) are coupled to a feedback loop of a sigma delta modulator.

The capacitors $Ct_x$ and $Cb_x$ are switched between a voltage source and a reference capacitor (by means of a first switch, coupled between the voltage source and a first node of the capacitors $Ct_x$ and $Cb_x$, and a second switch, coupled between the first node of the capacitors $Ct_x$ and $Cb_x$ and the first node of the reference capacitor), and charge is transferred from the capacitors $Ct_x$ and $Cb_x$ to the reference capacitor.

As the charge in the reference capacitor increases by charge transfer from the capacitors $Ct_x$ and $Cb_x$, so does the voltage across it. The voltage across the reference capacitor is fed to one input of a comparator, whose other input is kept at the threshold voltage. When the input of the comparator reaches the threshold voltage, a discharge circuit (e.g., a resistor in series to a switch) in shunt to the reference capacitor is activated and the reference capacitor is discharged at a rate determined by the starting voltage across the reference capacitor and the resistance of the discharge circuit. As the voltage across the external capacitor decreases, it again passes the threshold voltage and the discharge circuit is deactivated. The charge/discharge cycle is then repeated: charge is again transferred from the capacitors $Ct_x$ and $Cb_x$ to the reference capacitor, to increase again the voltage across the reference capacitor, and so on. The charge/discharge cycle of the reference capacitor produces a bit stream at the comparator output. Such bit stream is put in logical 'AND' with a pulse-width modulator to enable a timer. The timer output is used for processing the extent of the change of the capacitances Ctx and Cbx.

Another known capacitance measuring methods is the "RC method": in this case, the unknown capacitance to be determined is derived from the time needed to charge or discharge the capacitor whose capacitance is to be determined through a resistor of known resistance.

A further known method for measuring a capacitance is the "Wheatstone bridge method": in this method, a Wheatstone bridge is balanced in order to bring unbalance currents to zero.

It should be noted that the top pads 425 or back pads 430 provided on the humidity sensor 400 according to the invention may be exploited in a number of different manners in order to measure the humidity of the laundry items in the drum 110.

For example, the top pads 425 may be used individually, each forming a respective capacitors $Ct_x$ with the conductive tracks 520 that route the reference electric potential Vref; thus, each providing a respective capacitance Ctx measurement.

Alternatively, the top pads 425 may be used together as a single probe in order to achieve a higher sensitivity, i.e. top pads 425 forms a single capacitor $Ct_x$ with the conductive tracks 520 that route the reference electric potential Vref, thus each providing a single capacitance Ctx measurement.

Similarly, the back pads 430 may be used individually, each forming a respective capacitors $Cb_x$ with the conductive tracks 520 that route the reference electric potential Vref; thus, each providing a respective capacitance Cbx measurement.

Alternatively, the back pads 430 may be used together as a single probe in order to achieve a higher sensitivity, i.e. back pads 430 forms a single capacitor $Cb_x$ with the conductive tracks 520 that route the reference electric potential Vref, thus each providing a single capacitance Cbx measurement.

In other words, top pads 425 and back pads 430 of the sensing arrangement 410 may be used individually, thus obtaining a plurality of electric signals associated with the humidity of the laundry items to be/being treated by the laundry appliance 100 or together, thus obtaining two probes featuring a high sensitivity (at least higher than a sensitivity of the single top pad 425 or back pad 430), i.e. able to collect a greater electric signal associated with the humidity of the laundry items to be/being treated by the laundry appliance 100.

As an alternative or in addition, couples of top pads 425 and back pads 430 may be used for obtaining one or more differential measurements of the humidity of the laundry items to be treated by the laundry appliance 100. For example, the measures of each top pad 425 and of back pad 430 superimposed to the former are combined (e.g., subtracted and, possibly, processed in a feedback loop by the control circuitry 415) in order to obtain a corresponding measurement of a differential type.

The differential measurement allows to suppress, or at least to substantially reduce detrimental effects that affects top pads 425 and back pads 430 substantially equally, such as for examples noises and offsets due to common mode sources (known in the art and, thus, not herein further discussed for the sake of brevity).

Particularly, the differential measurement allows to suppress, or at least to substantially reduce, errors and offset on the measurement that may be due to conductivity changes caused by temperature both global and local) variations.

Indeed, top pads 425 and back pads 430 are substantially at the same temperature (being mounted to the same electronic board 405 and spatially close one to the other) and have substantially the same physical and structural properties (being preferably formed with the same shape and size and of the same material). Therefore, the effects due to temperature are substantially equals for the top pads 425 and back pads 430 and can be substantially removed by performing the measurement differentially (which substantially eliminates same-value components of the measurement performed by means of the top pads 425 and back pads 430).

As a further alternative or addition, top pads 425 may be used together with corresponding back pads 430 in order to provide a configuration of the sensing arrangement 410 comprising one or more sensing pads (e.g., comprising the top pads 425) associated with respective one or more shield pads (e.g., comprising the back pads 430). Such configuration of the sensing arrangement 410 ensures a substantial noise suppression and improves a sensitivity of the humidity sensor 400.

Regardless how the top pads 425 and back pads 430 are exploited for performing the capacitance measurements, short circuits and, more generally, substantial unwanted exchange of electric charges may occur between couples of top pads 425 on the top surface 405a of the electronic board 405, and between couples of back pads 430 on the back surface 405b of the electronic board 405.

Indeed, moisture (and/or any other electrically conductive foreign matters) settling on the top surface 405a or on the back surface 405b of the electronic board 405 may create electrically conductive links between two (or more) top pads 425 or two (or more) back pads 430, respectively.

According to an embodiment of the invention, all the top pads 425 are maintained substantially at a same (top) voltage value and, similarly, all the back pads 430 are maintained substantially at a same (back) voltage value. In this way, even in case electrically conductive links are created between top pads 425 or back pads 430 minimal, to none, electric charges are transferred through the electrically conductive links since all the top pads 425 or back pads 430 are at the same voltage value.

Therefore, humidity measurements may comprise the having the control circuitry 415 'reading' values detected by top pads 425 or back pads 430 both sequentially and in parallel without experiencing errors introduced by possible electrically conductive links caused by moisture.

As a yet another alternative or addition, humidity measurements based on the top pads 425 and back pads 430 may be combined with temperature measurements (e.g., accounting for the temperature within the drum 110) in order to analyze a relationship between humidity and temperature during the treatment of laundry items in order to dynamically controlling and improving the operation of the laundry appliance 100. For example, the temperature information provided by sensor may be used for correcting temperature-induced errors affecting the humidity measurements performed by the humidity sensor 400.

In an embodiment of the invention, the laundry appliance 100 may comprise a temperature sensor (not shown in the drawings), such as a temperature sensor comprising a Negative Temperature Coefficient (NTC) resistor. In a preferred embodiment of the invention (not shown), the temperature sensor may be provided on the humidity sensor 400, for example comprised in, or electrically connected to, the control circuitry 415 thereof. By providing the temperature sensor on the humidity sensor it is possible to obtain a temperature information indicating the effective temperature at which the humidity sensor 400 is operating, thus leading to a more accurate correction of the temperature-induced errors affecting the humidity measurements.

Figure 7:
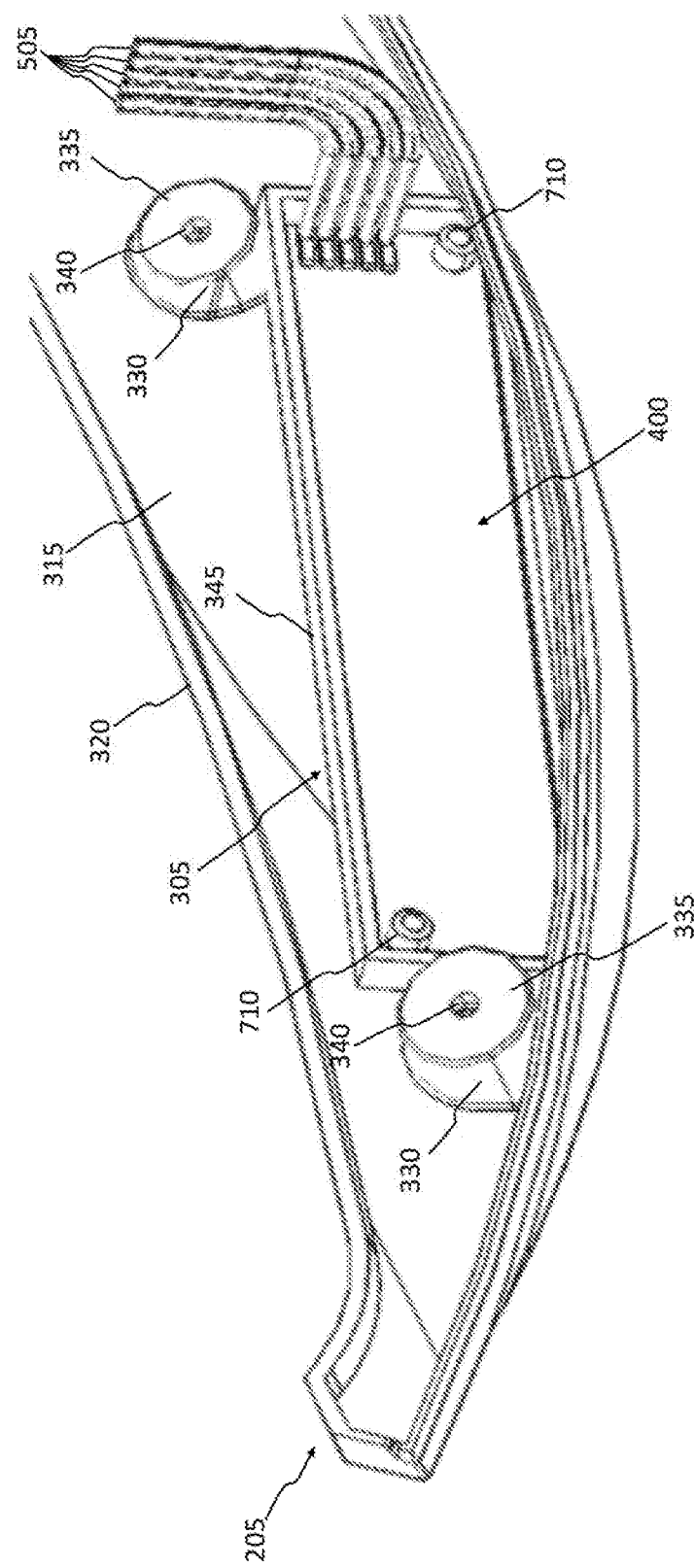
FIG. 7 is a perspective detail view of the cover plate of FIGS. 3A and 3B housing the humidity sensor of FIGS. 4A and 4B.

As shown in FIG. 7, which is a perspective detail view of the cover plate 205 housing the humidity sensor 400, the humidity sensor 400 is coupled with the cover plate 205 at the housing 305.

The humidity sensor 400 is positioned within the housing 305 in such a way that centering pins, two centering pins 710 are shown in the example of FIG. 7, are inserted into respective fastening through holes 455 of the electronic board 405.

Preferably, the centering pins 710 are made in plastic material, even more preferably are made integral with the cover plate 205 and of the same material.

Once the centering pins 710 are inserted in the respective through holes 455 of the electronic board 405, the centering pins 710 may be welded, either ultrasonically or thermally, in order that the humidity sensor 400 is firmly held within the housing 305. Preferably, the welding of the centering pins 710 allows the humidity sensor 400 to be maintained substantially in contact with the inner surface 315 of the cover plate 205 delimited by the perimeter sidewall 360 of the housing 305. For example, the humidity sensor 400 is arranged in the housing 305 with the back surface 405b and, thus, the back pads 430 of the sensing arrangement 410, substantially in contact with the inner surface 315 of the cover plate 205.

It should be noted that having both the control circuitry 415 and the connector interface 420 on the same surface 405a of the electronic board 405 of the humidity sensor 400 allows the back pads 430 provided on the opposite surface 405b to be substantially in contact with the inner surface 315 of the cover plate 205. In other words, the connector interface 420 (and, possibly the control circuitry 415), according to embodiments of the present invention, is arranged in order that at least one of the surfaces 405a or 405b has a substantially flat and even outline that allows a substantially homogeneous contact of the considered at least one of the surfaces 405a or 405b and a corresponding flat surface, such as for example the inner surface 315 of the housing 305.

As mentioned above wirings 505 are electrically coupled with the connector interface 420 of the humidity sensor 400. The wirings 50S are arranged for providing power supply and exchange data to/from the control unit 150 of the laundry appliance 100.

Since the humidity sensor 400 operation may be negatively affected by surface moisture that may deposit on the humidity sensor 400 during the laundry appliance 100 operation and cause sensing errors, short circuits and/or corrosion of metal parts of the humidity sensor 400, the humidity sensor 400 is insulated from the environment.

For example, the humidity sensor 400 may be protected by a potting encapsulation 805 as shown in FIG. 8, which is a perspective detail view of the cover plate 205 housing the humidity sensor 400 encapsulated by the potting encapsulation 805.

Preferably, the potting encapsulation 805 may comprise insulating materials, preferably a lowable insulating material, such as for example silicones, epoxies, polyesters, and urethanes.

In one embodiment of the invention, the insulating materials are injected or deposited over the humidity sensor 400 in the housing 305. Preferably, the whole housing 305 is filled with the insulating materials. Even more preferably, the insulating materials are deposited in the housing until are substantially flush with a free end of the perimeter sidewall 360. In other words, the insulating materials fill the whole volume delimited by the perimeter sidewall 360 from the inner surface 315 upwards for total height of the sidewall 360. Therefore, the potting encapsulation 805 encloses the humidity sensor 400, the centering pins 710 and a portion of the wirings 505.

In other words, the humidity sensor 400 is potted by exploiting the cover plate 205 as a 'tub' for a 'bath' of the insulating materials that are poured onto the humidity sensor 400 in place in the housing 305.

The insulating materials are then cured (e.g., by applying a predetermined temperature to the insulating materials or at air temperature), thus obtaining the potting encapsulation 805 that covers the humidity sensor 400 preventing moisture, water and/or foreign matters to contact any parts thereof.

The potting encapsulation 805 provides also a mechanical protection to the humidity sensor 400. Particularly, the potting encapsulation 805 prevents that the humidity sensor 400 is directly hit by detached components, tools, etc. both during manufacturing, and after manufacturing of the laundry machine 100. Moreover, the potting encapsulation 805 eliminates, or substantially reduces, the possibility that electronic components soldered to the electronic board 405 (e.g., comprised in the control circuitry 415) may detach therefrom due to vibration (or other shocks) to which the humidity sensor 400 may be subjected.

The Applicant has found that a potting encapsulation 805 provides a suitable protection with a thickness preferably greater than 1.5 mm, even more preferably a suitable protection is achieved with a thickness of at least 2 mm.

In alternative embodiments (not shown) according to the present invention, an insulating casing may be provided for containing and protecting the humidity sensor 400 from moisture, water, foreign matters and/or shocks instead of, or in addition to, the potting encapsulation describe 805 above.

Thanks to the humidity sensor 400 and the cover plate 205 according to the embodiments of the present invention it is possible to perform measurements of the humidity of laundry items stored in the drum 110 to be, or being, treated by the laundry appliance 100 in a plurality of different manners at the same time ensuring a substantial accuracy and precision of the measurements.

It should be noted that a mounting operation of the humidity sensor 400 in the laundry appliance 100 according to the present invention is simple allowing a simple manufacturing of the laundry appliance 100. Moreover, the structure of the cover plate 205 and the potting encapsulation 805 ensure a substantially thorough insulation of the humidity sensor 400 from moisture and foreign matters that could compromise a functionality thereof, at the same time without impairing sensing performance of the humidity sensor 400.

The invention claimed is:

1. A laundry appliance comprising:
   a laundry drying chamber;
   a sensor configured to generate one or more electric signals accounting for a degree of humidity of the laundry items contained in the laundry drying chamber, the sensor comprising:
   a base having a first surface and a second surface opposite to the first surface;
   at least one first pad provided on the first surface of the base and at least one second pad provided on the second surface of the base, the at least one first pad and the at least one second pad each being made of an electrically conductive material and being configured to operate as a plate of a capacitor;
   a cabinet accommodating the laundry treatment chamber, the cabinet comprising a front panel; and
   a cover plate mountable to the front panel, the cover plate comprising a housing configured to enclose the sensor.

2. The laundry appliance according to claim 1, wherein each of the at least one first pad and the at least one second pad are arranged on the first surface and on the second surface, respectively, of the base, such that the at least on first pad and the at least one second pad are substantially superimposed in a direction orthogonal to the first surface and the second surfaces, and the at least one first pad and the at least one second pad are separated by the base.

3. The laundry appliance according to claim 1, wherein the base comprises an electronic board comprising a first metal layer provided at the first surface and a second metal layer at the second surface, and the at least one first pad comprises an etched portion of the first metal layer, and the at least one second pad comprises an etched portion of the second metal layer.

4. The laundry appliance according to claim 1, wherein the at least one first pad and the at least one second pad have substantially the same size and shape in plan view.

5. The laundry appliance according to claim 1, wherein the sensor further comprises a control circuitry configured to process electric signals generated by the sensor, and the base comprises an electronic board having:
   at least one first track formed on the base and electrically connecting the at least one first pad with the control circuitry, and
   at least one second track formed on the base and electrically connecting the at least one second pad with the control circuitry.

6. The laundry appliance according to claim 5, wherein the control circuitry is provided on the first surface of the electronic board, and
   wherein the sensor further comprises at least one via, the at least one via passing through the electronic board from the first surface to the second surface and being electrically connected to the least one second track on the second surface and to the control circuitry on the first surface.

7. The laundry appliance according to claim 5, wherein the control circuitry comprises one or more electronic components configured to filter, amplify, digitalize and/or otherwise manipulate the electric signals generated by the sensor.

8. The laundry appliance according to claim 1, wherein the cover plate comprises an outer surface and an inner surface opposite to the outer surface, the outer surface facing towards the laundry items contained in the laundry treatment chamber and the inner surface facing the front panel once the cover plate is mounted to the front panel of the cabinet, and
   wherein the housing is provided on the inner surface of the cover plate.

9. The laundry appliance according to claim 8, wherein the housing comprises a sidewall protruding from the inner surface of the cover plate, the sidewall enclosing the sensor when the sensor is received in the housing.

10. The laundry appliance according to claim 1, wherein the at least one second pad provided on the second surface of the sensor is in contact with the inner surface of the cover plate when the sensor is positioned within the housing.

11. The laundry appliance according to claim 10, wherein the housing further comprises at least one retaining element engaging with the sensor and maintaining the sensor in position with the second surface of the sensor in contact with the inner surface of the cover plate.

12. The laundry appliance according to claim 1, further comprising a protective packaging surrounding at least a portion of the sensor, the protective packaging insulating at least the portion of the sensor from moisture and foreign matters.

13. The laundry appliance according to claim 5, further comprising an electronic control unit configured for managing the operation of the laundry appliance, and
wherein the sensor further comprises a connector interface electrically coupled with the control circuitry, the connector interface receiving wirings configured to performing at least one of:
receiving electric power supply, and
exchanging electric signals with the control unit of the laundry appliance.

14. A method of sensing humidity of a laundry mass within a laundry appliance having a laundry drying chamber, and a sensor configured to generate one or more electric signals accounting for a degree of humidity of the laundry items contained in the laundry drying chamber, the sensor comprising a base having a first surface and a second surface opposite to the first surface, at least one first pad provided on the first surface of the base and at least one second pad provided on the second surface of the base, the at least one first pad and the at least one second pad each being made of an electrically conductive material and being configured to operate as a plate of a capacitor, the method comprising:
acquiring a first capacitance information from the at least one first pad:
acquiring a second capacitance information from the at least one second pad, and
combining the first capacitance information and the second capacitance information in a combined capacitance information, wherein combining comprises differentially combining the first capacitance information and the second capacitance information in order to reduce detrimental effects that affects substantially equally the at least one first pad and the at least one second pad.

* * * * *